(12) United States Patent
Jiang et al.

(10) Patent No.: US 11,323,235 B2
(45) Date of Patent: May 3, 2022

(54) METHOD FOR CONTROLLING BWP, RELEVANT DEVICE AND SYSTEM

(71) Applicant: VIVO MOBILE COMMUNICATION CO., LTD., Chang'an Dongguan (CN)

(72) Inventors: Lei Jiang, Chang'an Dongguan (CN); Zhi Lu, Chang'an Dongguan (CN); Wei Bao, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 88 days.

(21) Appl. No.: 16/633,717

(22) PCT Filed: Jul. 6, 2018

(86) PCT No.: PCT/CN2018/094811
§ 371 (c)(1),
(2) Date: Jan. 24, 2020

(87) PCT Pub. No.: WO2019/019893
PCT Pub. Date: Jan. 31, 2019

(65) Prior Publication Data
US 2020/0213069 A1 Jul. 2, 2020

(30) Foreign Application Priority Data
Jul. 26, 2017 (CN) .......................... 201710619628.3

(51) Int. Cl.
*H04L 5/00* (2006.01)
*H04W 72/04* (2009.01)

(52) U.S. Cl.
CPC ............ *H04L 5/0098* (2013.01); *H04L 5/001* (2013.01); *H04W 72/042* (2013.01); *H04W 72/0446* (2013.01); *H04W 72/0453* (2013.01)

(58) Field of Classification Search
CPC ........... H04W 72/042; H04W 72/0453; H04W 72/0446; H04L 5/001; H04L 5/0098
See application file for complete search history.

(56) References Cited

U.S. PATENT DOCUMENTS

2010/0130219 A1\* 5/2010 Cave ...................... H04W 8/26
455/450
2015/0063259 A1 3/2015 Gohari et al.
(Continued)

FOREIGN PATENT DOCUMENTS

| CN | 105099634 A | 11/2015 |
| CN | 106165318 A | 11/2016 |
| WO | WO 2016/163819 A1 | 10/2016 |

OTHER PUBLICATIONS

NTT DOCOMO, INC.; "New Radio (NR) Access Technology"; 3GPP TSG RAN meeting #76, RP-1711505, West Palm Beach, USA. Jun. 5, 2017-Jun. 8, 2017.
(Continued)

*Primary Examiner* — Kevin C. Harper
(74) *Attorney, Agent, or Firm* — von Briesen & Roper, s.c.

(57) ABSTRACT

The present disclosure provides a method for controlling BWP, a relevant device and a system. The method includes: notifying a UE to activate or deactivate a target BWP by transmitting DCI at least once which includes information of the target BWP for activating or deactivating the target BWP.

19 Claims, 6 Drawing Sheets

(56) References Cited

U.S. PATENT DOCUMENTS

| | | | |
|---|---|---|---|
| 2016/0014727 A1* | 1/2016 | Nimbalker | H04W 72/042 370/329 |
| 2017/0135105 A1 | 5/2017 | Li et al. | |
| 2017/0188350 A1 | 6/2017 | Kim et al. | |
| 2017/0238284 A1* | 8/2017 | Tseng | H04W 72/042 370/329 |
| 2017/0359826 A1* | 12/2017 | Islam | H04W 72/085 |
| 2018/0069612 A1 | 3/2018 | Yum et al. | |
| 2020/0214027 A1* | 7/2020 | Tang | H04W 80/02 |

OTHER PUBLICATIONS

Chinese First Office Action Apolication No. 201710619628.3; reported on Mar. 20, 2020.
Chinese-Second Office Action Application No. 201710619628.3; reported on Jun. 15, 2020.
European Search Report Application No. 18838254.3; reported on Jun. 15, 2020.
International Search Report & Written Opinion related to Application No. PCT/CN2018/094811; reported on Sep. 21, 2018.
Intel Corporation; "Bandwidth parts configuration and operations", 3GPP TSG RAN WG1 Meeting #89, R1-1707420, Hangzhou, China. May 15, 2017-May 19, 2017.
ZTE; "Resource allocation for wideband operation", 3GPP TSG RAN WG1 NR ad-Hoc#2, R1-1710126, Qingdao, P.R. China, Jun. 27, 2017-Jun. 30, 2017.
Guangdong Oppo Mobile Telecom; "Bandwidth part configuration and frequency resource allocation", 3GPP TSG RAN WG1 NR Ad-Hoc#2, R1-1710164, Qingdao, P.R. China, Jun. 27, 2017-Jun. 30, 2017.
LG Electronics; "Discussion on Bandwidth Part Configurations", 3GPP TSG RAN WG1 Meeting Ad-Hoc, R1-1711574, Qingdao, P.R. China, Jun. 27, 2017-Jun. 30, 2017.
Samsung; "Wider Bandwidth Operations", 3GPP TSG RAN WG1 NR Ad-Hoc#2, R1-1710761, Qingdao, P.R. China, Jun. 27, 2017-Jun. 30, 2017.
Huawei, Hisilicon; "On bandwidth adaption", 3GPP TSG RAN WG1 NR Ad-Hoc Meeting, R1 -1711424, Qingdao, China, Jun. 27, 2017-Jun. 30, 2017.

* cited by examiner

METHOD FOR CONTROLLING BWP, RELEVANT DEVICE AND SYSTEM

CROSS-REFERENCE TO RELATED APPLICATION

This application is the U.S. national phase of PCT Application No. PCT/CN2018/094811 filed on Jul. 6, 2018, which claims priority to Chinese Patent Application No. 201710619628.3 filed on Jul. 26, 2017, the disclosures of which are incorporated in their entirety by reference herein.

TECHNICAL FIELD

The present disclosure relates to the field of communication technology, and in particular to a method for controlling bandwidth part (BWP), a relevant device and a system.

BACKGROUND

Future mobile communication systems (for example, 5G systems) need to adapt to more diverse scenarios and service requirements, such as Enhanced Mobile Broadband (eMBB), Ultra Reliable & Low Latency Communication (uRLLC), and massive machine type of communication (mMTC), etc. These scenarios require systems with high reliability, low latency, large bandwidth and wide coverage. In order to adapt to services with different requirements and different application scenarios, the future mobile communication systems may support various subcarrier intervals which are applicable to different scenarios. In the future mobile communication systems, the maximum channel bandwidth of each subcarrier is increased. For example, in the 5G communication systems, the maximum channel bandwidth of each subcarrier is 400 MHz. However, not all User Equipments (UEs) support 400 MHz. Therefore, in the future communication systems, the maximum bandwidth supported by a UE may be less than 400 MHz, and the UE may work on multiple small bandwidth parts (BWPs), which requires the base station to notify the UE of which BWP to work on, that is, which BWP should be activated. Of course, it may also be necessary to notify the UE to activate the BWP. It can be seen that how to notify the UE to activate or deactivate the BWP is a technical problem that needs to be solved urgently.

SUMMARY

Embodiments of the present disclosure provide a method for controlling BWP, a relevant device and a system to solve the problem of how to notify the UE to activate or deactivate the BWP.

In a first aspect, an embodiment of the present disclosure provides a method for controlling BWP applicable to a base station, the method including:

transmitting downlink control information (DCI) to a user equipment at least once, wherein each DCI includes information of a target BWP for notifying the UE to activate or deactivate the target BWP; and activating or deactivating the target BWP after transmitting one or more DCI.

In a second aspect, an embodiment of the present disclosure provides a method for controlling BWP applicable to a UE, the method including:

receiving at least one DCI transmitted by a base station, wherein each DCI includes information of a target BWP for notifying the UE to activate or deactivate the target BWP; and activating or deactivating the target BWP according to the information of the target BWP after receiving one or more DCI.

In a third aspect, an embodiment of the present disclosure provides a base station including:

a transmitting module configured to transmit DCI to a user equipment at least once, wherein each DCI includes information of a target BWP for notifying the user equipment to activate or deactivate the target BWP; and a first control module configured to activate or deactivate the target BWP after one or more DCI are transmitted.

In a fourth aspect, an embodiment of the present disclosure provides a user equipment including:

a first receiving module configured to receive at least one DCI transmitted by a base station, wherein each DCI includes information of a target BWP for notifying the UE to activate or deactivate the target BWP; and a second control module configured to activate or deactivate the target BWP according to the information of the target BWP after one or more DCI are received.

In a fifth aspect, an embodiment of the present disclosure provides a base station including: a storage, a processor, and a computer program which is stored on the storage and is capable of running on the processor, the computer program, when executed by the processor, is capable of implementing the steps in the above method for controlling BWP applicable to a base station.

In a sixth aspect, an embodiment of the present disclosure provides a user equipment, including: a storage, a processor, and a computer program which is stored on the storage and is capable of running on the processor, the computer program, when executed by the processor, is capable of implementing the steps in the method for controlling BWP applicable to a UE.

In a seventh aspect, an embodiment of the present disclosure provides a control system of BWP including the base station and the user equipment provided by the embodiments of the present disclosure.

In an eighth aspect, an embodiment of the present disclosure provides a computer readable storage medium which stores thereon a computer program that, when executed by a processor, implements the steps in the above method for controlling BWP applicable to a base station.

In a ninth aspect, an embodiment of the present disclosure provides a computer readable storage medium which stores thereon a computer program that, when executed by a processor, implements the steps in the above method for controlling BWP applicable to a user equipment.

BRIEF DESCRIPTION OF THE DRAWINGS

In order to more clearly illustrate the technical solutions of the embodiments of the present disclosure, the drawings used in the description of the embodiments of the present disclosure will be briefly described below. It is obvious that the drawings in the following description are only some embodiments of the present disclosure. Other drawings may also be obtained by those of ordinary skill in the art in view of the drawings without creative efforts.

DETAILED DESCRIPTION

The technical solutions in the embodiments of the present disclosure will be clearly and completely described below in conjunction with the drawings in the embodiments of the present disclosure. It is apparent that the described embodiments are some of the embodiments of the present disclosure, and not all of them. All other embodiments obtained by those of ordinary skill in the art based on the embodiments of the present disclosure without paying for inventive labor fall within the protective scope of the present disclosure.

Figure 1:
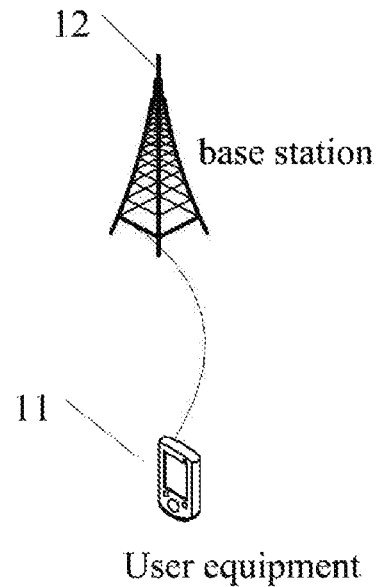
FIG. 1 is a structural diagram of a BWP control system according to an embodiment of the present disclosure.

Referring to FIG. 1, which is a structural diagram of a BWP control system according to an embodiment of the present disclosure. As shown in FIG. 1, the system includes a user terminal 11 and a base station 12, wherein the user terminal 11 may be a User Equipment (UE), for example, terminal-side devices such as a mobile, a tablet personal computer, a laptop computer, a personal digital assistant (PDA), a mobile internet device (MID), or a wearable device, etc. It should be noted that the specific type of the user terminal 11 is not limited in the embodiment of the present disclosure. The above base station 12 may be a 5G base station (e.g., the gNB, the 5G NR NB), or a 4G base station (e.g., the eNB), or a 3G base station (e.g., the NB), and so on. It should be noted that the specific type of the base station is not limited in the embodiment of the present disclosure.

It should be noted that the specific functions of the above user terminal 11 and the base station 12 will be described in detail by using the following several embodiments.

Figure 2:
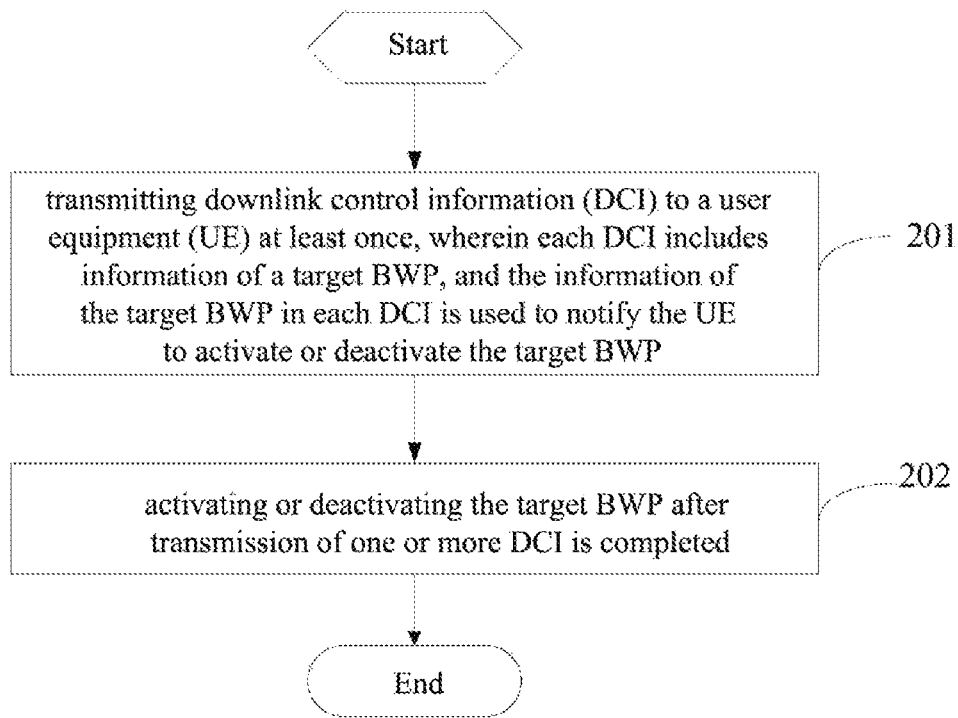
FIG. 2 is a flow chart of a method for controlling BWP according to an embodiment of the present disclosure.

Referring to FIG. 2, which is a flow chart of a method for controlling BWP according to an embodiment of the present disclosure. As shown in FIG. 2, the method includes the following steps.

Step 201, transmitting downlink control information (DCI) to a user equipment (UE) at least once, wherein each DCI includes information of a target BWP, and the information of the target BWP in each DCI is used to notify the UE to activate or deactivate the target BWP.

In order to adapt to services with different requirements and different application scenarios, in the future mobile communication systems, the maximum channel bandwidth of each subcarrier is increased, and various subcarrier intervals which are applicable to different scenarios may be supported. For example, in the 5G communication systems, the maximum channel bandwidth of each subcarrier is 400 MHz. However, not all User Equipments (UEs) can support 400 MHz. The maximum bandwidth supported by a UE may be less than 400 MHz, and the UE may work on multiple small bandwidth parts (BWPs), which requires the base station to notify the UE of which BWP to work on, that is, which BWP should be activated, or it may also be necessary to notify the UE to activate the BWP.

In this step, when the base station needs to notify the UE of which BWP should be activated or deactivated, the base station may send the DCI to the UE at least once, so as to notify the UE of which BWP should be activated or deactivated, that is, to notify the UE that it should activate or deactivate a target BWP.

Optionally, each DCI includes information of the target BWP that the base station wants to inform the UE to activate or deactivate, and the information of the target BWP in each DCI is used to inform the UE to activate or deactivate the target BWP.

Optionally, the information of the target BWP in each DCI may include relevant information for indicating the activation or deactivation of the target BWP, for example, information for specifically indicating which BWP is to be activated or deactivated, and may also include information about the bandwidth and the frequency of the BWP.

Optionally, activating the target BWP may be starting the target BWP, so that the UE can work on the target BWP and can perform data transmission with the base station; deactivating the target BWP may be shutting-down the target BWP or release the working state of the target BWP if the UE does not need to work on the target BWP, so that the data transmission between the UE and the base station is no longer performed through the target BWP.

In this way, the base station can notify the UE of the target BWP that will be activated or deactivated by transmitting the DCI carrying the information including the target BWP for activating or deactivating the target BWP, so that the UE can switch to the target BWP in time, and the probability of missing or false detection of the DCI including the target BWP information by the UE can be reduced by transmitting the DCI multiple times, thereby improving the probability that the UE correctly switches to the target BWP.

Step 202, activating or deactivating the target BWP after transmission of one or more DCI is completed.

In this step, after the base station sends the DCI to the UE at least once, the base station may activate or deactivate the target BWP after the transmission of the one or more DCI is completed.

Optionally, the expression that the base station activates or deactivates the target BWP after the transmission of the one or more DCI is completed may means that: the data transmission, which may be implemented through a wireless or a wired connection, is only between the base station and the UE which receives the DCI transmitted by the base station; when the UE needs to work on the target BWP, the base station may activate the target BWP after transmitting one or more DCI; when the UE does not need to work on the target BWP, the base station may deactivate the target BWP.

However, in general, a base station may simultaneously connect with multiple UEs to implement data transmission at the same time; thus, even if one UE does not need to work on the target BWP, other UEs may still need to work on the target BWP, or when one UE is not working on the target BWP, other UEs may already work on the target BWP. Therefore, in other implementations, or in a case that the base station is connected to multiple UEs, the base station may not need to activate or need to deactivate the target BWP after one or more DCI are transmitted, owing to the work requirements of other UEs.

It should be noted that, in the embodiment of the present disclosure, the above method may be applied to the base station shown in FIG. 1. Moreover, in the embodiment of the present disclosure, the above method may also be applied to an application scenario such as a 5G system, a Global System for Mobile Communication (GSM), and a Code Division Multiple Access (CDMA), and the like. In such an application scenario, a same user equipment may work on different BWPs, and the base station may inform the UE of the information for activating or deactivating the target BWP by transmitting, at least once, the DCI including the target BWP information for activating or deactivating the target BWP, so that the UE can switch to the target BWP in time, and the probability of missing or false detection of the DCI including the target BWP information by the UE can be reduced by transmitting the DCI at least once, thereby improving the probability that the UE correctly switches to the target BWP.

In the embodiment of the present disclosure, the DCI is transmitted to the UE at least once, wherein each DCI includes the information of the target BWP, and the information of the target BWP in each DCI is used to notify the UE to activate or deactivate the target BWP; the target BWP is activated or deactivated after one or more DCI are transmitted. Therefore, it is achieved to notify the UE to activate or deactivate the target BWP by the DCI. In addition, it is also achieved to cause the UE to switch to the target BWP in time, and the probability of missing or false detection of the DCI including the target BWP information by the UE can be reduced by transmitting the DCI at least once, thereby improving the probability that the UE correctly switches to the target BWP.

Figure 3:
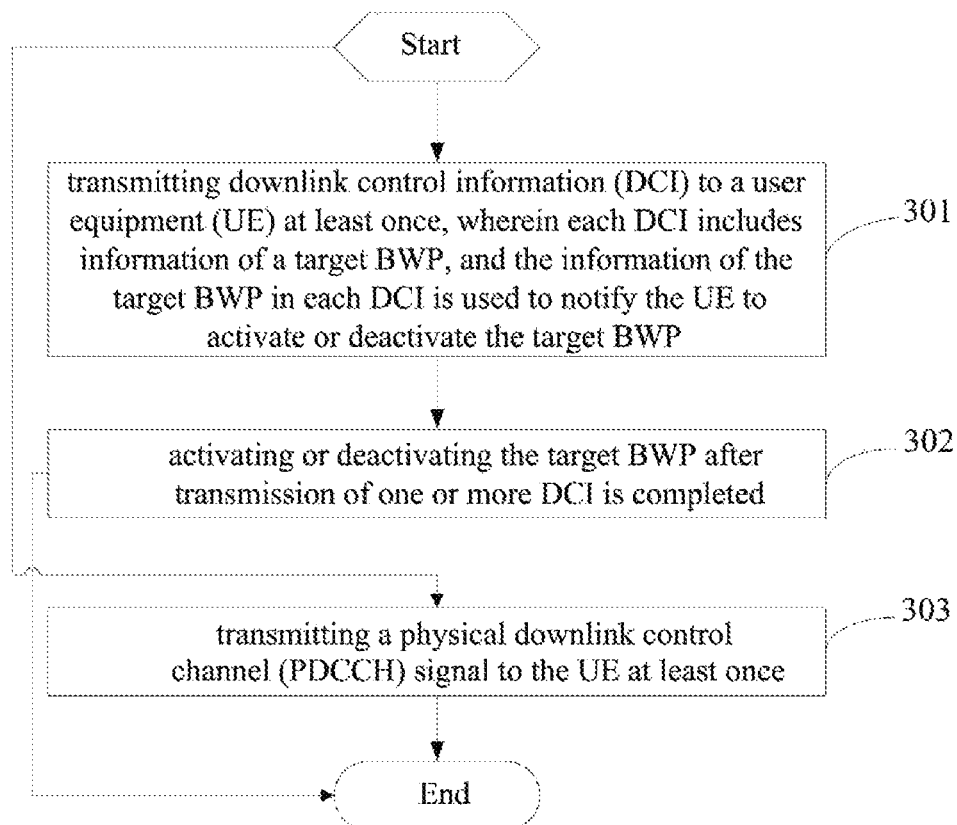
FIG. 3 is a flow chart of another method for controlling BWP according to an embodiment of the present disclosure.

Referring to FIG. 3, which is a flow chart of another method for controlling BWP according to an embodiment of the present disclosure. The method is applicable to a base station. As shown in FIG. 3, the method includes the following steps.

Step 301, transmitting downlink control information (DCI) to a UE at least once, wherein each DCI includes information of a target BWP, and the information of the target BWP in each DCI is used to notify the UE to activate or deactivate the target BWP.

In order to adapt to services with different requirements and different application scenarios, in the future mobile communication systems, the maximum channel bandwidth of each subcarrier is increased, and various subcarrier intervals which are applicable to different scenarios may be supported. For example, in the 5G communication systems, the maximum channel bandwidth of each subcarrier is 400 MHz. However, not all User Equipments (UEs) can support 400 MHz. The maximum bandwidth supported by a UE may be less than 400 MHz, and the UE may work on multiple small bandwidth parts (BWPs), which requires the base station to notify the UE of which BWP to work on, that is, which BWP should be activated, or it may also be necessary to notify the UE to activate the BWP.

In this step, when the base station needs to notify the UE of which BWP should be activated or deactivated, the base station may send the DCI to the UE at least once, so as to notify the UE of which BWP should be activated or deactivated, that is, to notify the UE that it should activate or deactivate a target BWP.

Optionally, each DCI includes information of the target BWP that the base station wants to inform the UE to activate or deactivate, and the information of the target BWP in each DCI is used to inform the UE to activate or deactivate the target BWP.

Optionally, the information of the target BWP in each DCI may include relevant information for indicating the activation or deactivation of the target BWP, for example, information for specifically indicating which BWP is to be activated or deactivated, and may also include information about the bandwidth and the frequency of the BWP.

Optionally, activating the target BWP may be starting the target BWP, so that the UE can work on the target BWP and can perform data transmission with the base station; deactivating the target BWP may be shutting-down the target BWP or release the working state of the target BWP if the UE does not need to work on the target BWP, so that the data transmission between the UE and the base station is no longer performed through the target BWP.

In this way, the base station can notify the UE of the target BWP that will be activated or deactivated by transmitting the DCI carrying the information including the target BWP for activating or deactivating the target BWP, so that the UE can switch to the target BWP in time, and the probability of missing or false detection of the DCI including the target BWP information by the UE can be reduced by transmitting the DCI multiple times, thereby improving the probability that the UE correctly switches to the target BWP.

Step 302, activating or deactivating the target BWP after transmission of one or more DCI is completed.

In this step, after the base station sends the DCI to the UE at least once, the base station may activate or deactivate the target BWP after the transmission of the one or more DCI is completed.

Optionally, the expression that the base station activates or deactivates the target BWP after the transmission of the one or more DCI is completed may means that: the data transmission, which may be implemented through a wireless or a wired connection, is only between the base station and the UE which receives the DCI transmitted by the base station; when the UE needs to work on the target BWP, the base station may activate the target BWP after transmitting one or more DCI; when the UE does not need to work on the target BWP, the base station may deactivate the target BWP.

However, in general, a base station may simultaneously connect with multiple UEs to implement data transmission at the same time; thus, even if one UE does not need to work on the target BWP, other UEs may still need to work on the target BWP, or when one UE is not working on the target BWP, other UEs may already work on the target BWP. Therefore, in other implementations, or in a case that the base station is connected to multiple UEs, the base station may not need to activate or need to deactivate the target BWP after one or more DCI are transmitted, owing to the work requirements of other UEs.

Step 303, transmitting a Physical Downlink Control Channel (PDCCH) signal to the UE at least once.

In this step, the base station may send the PDCCH signal to the UE at least once through PDCCH.

Wherein information included in the PDCCH signal transmitted to the UE by the base station may be information other than the DCI including the target BWP information transmitted to the UE by the base station, such as information for carrying scheduling and other control information, which may specifically include a transmission format, a resource allocation, an uplink scheduling permission, a power control, and an uplink retransmission information, etc.

The base station may enhance the reliability of the PDCCH by enhancing the connection between the base station and the UE by transmitting the PDCCH signal to the UE multiple times. For example, in the downlink URLLC service transmission, the reliability of receiving the PDCCH by the UE may be improved by continuously transmitting PDCCH signals multiple times. The PDCCH signal for each transmission may be a repetition of exactly the same content, or may be an initial transmission version and a corresponding redundancy version. Each transmission may use the same resource, or may be performed on different control resource sets (CORESETs), and may also use different Cyclic Redundancy Check (CRC) or Demodulation Reference Signal (DMRS), etc., to improve the accuracy of UE detection.

It should be noted that Step 303 is optical, that is, the present embodiment may be implemented without performing Step 303. Furthermore, the performing order of Step 303 and Steps 301 and 302 is not limited. For example, Step 303 may be performed simultaneously with Step 301 or Step 302, as shown in FIG. 3, which means Step 303 and Step 301 and/or 302 are independent steps, that is, the solution of Step 301 and/or Step 302 can be achieved without Step 303; alternatively, Step 303 may be performed after Step 302; alternatively, Step 303 may be performed before Step 301.

Optionally, the information of the target BWP includes an index for indicating the target BWP.

Optionally, the index may be information for specifically indicating which BWP is to be activated or deactivated by the UE.

Optionally, the DCI transmitted to the UE is a UE specific DCI, a group common DCI, a scheduling DCI or a configured grant DCI, wherein the UE specific DCI, the group common DCI, the scheduling DCI or the configured grant DCI includes therein an information field of information for indicating the target BWP; or the DCI transmitted to the UE is a DCI (separate DCI) dedicated to activating or deactivating the target BWP.

Optionally, the DCI transmitted to the UE by the base station may be one of the UE specific DCI, the group common DCI, the scheduling DCI or the configured grant DCI, and the UE specific DCI, the group common DCI, the scheduling DCI or the configured grant DCI that is transmitted to the UE by the base station includes therein an information field of information for indicating the target BWP. The information for indicating the target BWP may be information for indicating which BWP the target BWP is, and may also include information for indicating the bandwidth and frequency of the target BWP. Furthermore, the UE specific DCI, the group common DCI, the scheduling DCI or the configured grant DCI that is transmitted to the UE by the base station may also include together therein some information fields that the base station needs to send to the UE, such as scheduling information. That is to say, the information indicating the target BWP may be transmitted to the UE through the DCI together with other information. In the DCI transmitted to the UE multiple times by the base station, among the contents of the DCI transmitted each time, only the information for indicating the target BWP is identical, and other information may be different.

Optionally, the separate DCI that is dedicated to activating or deactivating the target BWP may be a separate DCI transmitted to the UE by the base station for activating or deactivating the target BWP only. The separate DCI includes only relevant information of the target BWP, and does not include other information, and the separate DCI is only used to indicate the information of the target BWP. In the separate DCI transmitted to the UE multiple times by the base station, the contents of the DCI transmitted each time may be identical, or may be different Redundancy Version (RV).

Optionally, prior to Step 301, the method includes: configuring a BWP set to the UE, the BWP set including N BWPs, wherein N is an integer greater than or equal to 1.

In this step, before the base station sends the DCI to the UE, the base station may perform configuration on the bandwidth part of the channel in which the UE is, i.e., configure a BWP set to the UE. The BWP set includes N BWPs, each BWP has an index of itself and the index for each BWP may be distinct.

Optionally, N is an integer greater than or equal to 1.

Optionally, each DCI indicates the index of the target BWP by using N or M×ceil($\log_2$ N) bits, wherein M is an integer greater than or equal to 1, and less than or equal to N, and the ceil is a rounding up function.

Optionally, M is the maximum number of BWPs that the UE can activate or deactivate at the same time.

Further, in order that the target BWP may be represented more concisely, the smaller one of N and the product of M×ceil($\log_2$ N) may be used to represent the BWPs in the BWP set, and the target BWP in the BWP set.

For example, if the number of the target BWP that the UE can activate or deactivate at the same time is 1, i.e., M is 1, and there are 5 BWPs in the configured BWP set, then (ceil($\log_2$ 5)) bits, i.e., 3 bits, are needed to indicate each BWP, for example, "000" indicates BWP1, "001" indicates BWP2, etc.

When the UE can activate or deactivate 2 or more target BWPs at the same time, the target BWP that needs to be activated or deactivated can be represented by min{N, M×ceil($\log_2$ N)} bits. For example, if the UE can activate 2 target BWPs at the same time (i.e., M is 2), and there are 5 BWPs in the BWP set configured for the UE by the base station (i.e., N is 5), then, by calculation, the number obtained by multiplying M by ceil($\log_2$ N) is 6. In order to make a concise representation, each BWP in the BWP set can be represented by 5 bits, thereby representing two BWPs in the target BWP, such as using "01010" to indicate that BWP2 and BWP4 are simultaneously activated or deactivated, where "1" in "01010" indicates activation or deactivation, and the position where "1" is located indicates a certain BWP.

Further, in the above example, in a case that M is 2 and N is 8, by calculation, the number obtained by multiplying M by ceil($\log_2$ 8) is 6. Thus, the BWP can be indicated by using 6 bits, such as using "001011" to indicate that BWP2 and BWP4 are simultaneously activated or deactivated. Here, "001" may represent BWP2, "011" may represent BWP4; each BWP may be represented by (ceil($\log_2$ 8)) bits, i.e., 3 bits, and M=2. Thus, the combination thereof is "001011", which is used to indicate that BWP2 and BWP4 needs to be activated or deactivated.

Optionally, each DCI includes indication information.

Optionally, the indication information included in each DCI may be used to indicate a timing for activating or deactivating the target BWP; or the indication information included in each DCI may also be used to indicate a transmission order of the DCI.

Further, the indication information included in each DCI may include both information for indicating the timing for activating or deactivating the target BWP and information for indicating the transmission order of the DCI.

In this way, the indication information in each DCI as transmitted can enable the UE to know a slot for activating or deactivating the target BWP by using the indication information when receiving the DCI.

Optionally, at least one of a cyclic redundancy check (CRC) code distinct to each DCI, a demodulation reference signal (DMRS) distinct to each DCI, or a distinct control source set (CORESET) in which each DCI is located is used to implicitly indicate the slot for activating or deactivating the target BWP, and/or the transmission order of the DCI.

Optionally, the CRC distinct to each DCI, the DMRS distinct to each DCI, or the CORESET in which each DCI is located may means that each DCI has multiple different CRCs or multiple different DMRSs, and each CRC of the multiple different CRCs is distinct or each DMRS of the multiple different DMRSs is distinct. The distinct CORESET in which each DCI is located may means that each DCI may be in a distinct CORESET, and each of the CORESETs is distinct. Therefore, the slot for activating or deactivating the target BWP, and/or the transmission order of the DCI may be implicitly indicated by using a distinct CRC for each DCI, or a distinct DMRS for each DCI, or a distinct CORESET in which each DCI is located.

In this way, the slot for activating or deactivating the target BWP, and/or the transmission order of the DCI may be implicitly indicated by using a distinct CRC for each DCI, or a distinct DMRS for each DCI, or a distinct CORESET in which each DCI is located, so that the UE may know, when receiving the DCI, the slot for activating or deactivating the target BWP, and/or the order of the received DCI by using different CRC, DMRS or CORESET without other additional signaling.

Optionally, the indication information included in each DCI is a count value, and a count value included in a retransmitted DCI is a count value for an initially transmitted DCI plus or minus the number of retransmissions.

Optionally, the count value may be a count value indicating the number of transmission of each DCI, and the count value for each transmission of the DCI may be represented by the count value for the last transmission of the DCI minus 1 or plus 1.

If the count value for an initially transmitted DCI is K, that is, the count value for the DCI that is transmitted first time is K, the count value included in a retransmitted DCI may be K minus the number of retransmission, where K is the number of transmission of the DCI preset by the base station, and is an integer greater than or equal to 1.

Further, if the count value for an initially transmitted DCI is K, the timing for activating or deactivating the target BWP may be a $h^{th}$ slot after (n+the received count value−1) slots, where n represents a receiving slot in which the UE receives the DCI, the received count value is the count value included in the DCI received by the UE, and h is an integer greater than or equal to 1.

For example, if the UE receives the DCI at the time of initial transmission, and the count value at the initial transmission is K, then the UE may start to activate the target BWP in the $h^{th}$ slot after (n+K−1) slots; if the UE receives the DCI at the time of the first retransmission, and the count value at the first retransmission may be (K−1), then the UE may start to activate the target BWP in the $h^{th}$ slot after (n+K−2) slots; if the UE receives the DCI at the time of the last retransmission, and the count value at the last retransmission is 1, then the UE may start to activate the target BWP in the $h^{th}$ slot after the UE receives the DCI.

If the count value included in the initially transmitted DCI is 1, that is, the count value for the DCI transmitted at the first time is 1, then the count value included in the retransmitted DCI is (1+the number of retransmission).

Further, if the count value included in the initially transmitted DCI is 1, then the timing for activating or deactivating the target BWP may be a $h^th$ slot after (n+K−the received count value) slots, where n represents a receiving slot in which the UE receives the DCI, the received count value is the count value included in the DCI received by the UE or may be considered as the count value included in each DCI as transmitted, and h is an integer greater than or equal to 1, where K is the number of transmitting the DCI preset by the base station, and is an integer greater than or equal to 1.

For example, if the UE receives the DCI at the time of initial transmission, and the count value at the initial transmission is 1, then it is indicated that the UE may start to activate the target BWP in the $h^{th}$ slot after (n+K−1) slots; if the UE receives the DCI at the time of the first retransmission, that is, the DCI received by the UE is the one that is transmitted by the base station for the second time, and the count value at the first retransmission may be 2, then it is indicated that the UE may start to activate the target BWP in the $h^{th}$ slot after (n+K−2) slots; if the UE receives the DCI at the time of the last retransmission, and the count value at the last retransmission is K, then the UE may start to activate the target BWP in the $h^{th}$ slot after the UE receives the DCI.

Optionally, Step 301 includes:

transmitting the downlink control information (DCI) to the UE for K times, where K is a preset number of transmission, and is an integer greater than or equal to 1. Each DCI includes the information of the target BWP, and the information of the target BWP in each DCI is used to notify the UE to activate or deactivate the target BWP.

In this step, the base station may decide to send the DCI to the UE for K times, where K is a preset number of transmission, and is an integer greater than or equal to 1, each DCI includes the information of the target BWP, and the information of the target BWP in each DCI is used to notify the UE to activate or deactivate the target BWP.

In this way, by transmitting DCI multiple times by the base station, the probability that the UE receives the DCI can be increased and the reliability that the UE receives the information of activating or deactivating the target BWP is improved.

Further, Step 302 includes:

activating or deactivating the target BWP after the DCI has been transmitted for K times.

In this step, the base station may immediately activate or deactivate the target BWP after the base station sends the DCI to the UE for K times and the K times of transmission of DCI is completed; or the base station may immediately activate or deactivate the target BWP in a preset slot after the K times of transmission of DCI is completed.

In this way, by transmitting DCI multiple times by the base station, the probability that the UE receives the DCI can be increased and the reliability that the UE receives the information of activating or deactivating the target BWP is improved, and thus the target BWP is activated or deactivated after the K times of transmission of DCI is completed.

Optionally, the transmitting the DCI to the UE for K times includes:

transmitting the DCI to the UE for K times in different slots, wherein the slot in which each DCI is located implicitly indicates a transmission order of the DCI.

Optionally, the expression that the base station sends the DCI to the UE for K times in different slots may means that the base station sends the DCI to the UE for K times in a slot interval of different slot bundle or different slot window, and the slot bundle or slot window may be a slot interval composed of a plurality of different and consecutive plurality of slots.

The slot bundle or slot window may be formed by dividing the slot of the original BWP by the base station into multiple slot intervals. Each of the slot interval forms one slot bundle or one slot window. Since each slot has a fixed position in a corresponding slot bundle or slot window, the transmission order of the DCI in each slot may be implicitly indicated by the position of each slot in each slot bundle or slot window. The transmission order is similar to the count value in each DCI in the foregoing, and may be used to indicate which time the transmitted DCI is transmitted.

Optionally, the base station may divide the slot of the original BWP into the slot bundles or slot windows, and each of the slot bundles or slot windows includes therein K slots. In this way, the base station may send the DCI to the UE for K times in each slot bundle or slot window, and the slot for transmitting the DCI each time may implicitly indicate the transmission order of this transmission of the DCI.

For example, if the base station needs to send the DCI to the UE for 3 times, the base station may obtain multiple slot bundles or slot windows by division, and each slot bundle or slot window has 3 slots. If the base station sends the DCI to the UE in the second slot bundle or slot window, and the DCI received by the UE is in the first position of the second slot bundle or window, then the UE can know that the received DCI is the DCI transmitted for the first time.

Optionally, the transmitting the downlink control information (DCI) to the UE for K times includes:

transmitting the DCI to the UE for K times at an original BWP.

Optionally, the original BWP may be the BWP by which the base station and the UE is connected.

Further, the activating or deactivating the target BWP after one or more DCI are transmitted includes:

activating the target BWP if a first transmission of the DCI to the UE is completed.

In this step, after the base station sends the DCI to the UE and the first transmission of the DCI is completed, the base station may activate or deactivate the target BWP.

Optionally, the activation of the target BWP after the completion of the first transmission of DCI by the base station to the UE may be performed after the completion of the first transmission of DCI and before the second transmission of the DCI.

Further, instead of activating the target BWP by the base station after the completion of the first transmission of DCI, in other implementation, the base station may deactivating the target BWP after the completion of the first transmission of DCI.

In this way, when detecting the DCI transmitted by the base station, the UE may decide to activate or deactivate the target BWP whenever it receives the DCI. Thus, it is not necessary to add a timing for indicating the activation or deactivation of the target BWP in the transmitted DCI, or the indication information for indicating the transmission order of the DCI, so that the data throughput when transmitting the DCI may be reduced, and additional signaling overhead and/or the number of the detection by the UE may also be reduced.

Optionally, each DCI that is transmitted to the UE is identical, and is transmitted in different slot, the slot in which each DCI is located implicitly indicates a transmission order of the DCI; or, each DCI that is transmitted to the UE has distinct redundancy version, and is transmitted in different slot, the slot in which each DCI is located implicitly indicates a redundancy version of the DCI.

Optionally, each DCI that is transmitted to the UE by the base station is identical, which may mean that the content of the DCI transmitted each time is identical, or means that the indication information for indicating the target BWP in the DCI transmitted each time is identical which the redundancy version of each DCI is distinct.

Optionally, each DCI is transmitted in different slot, and the slot in which each DCI is located implicitly indicates the transmission order of the DCI, which may means that, as described above, the slot is divided into multiple slot bundles or windows, the DCI is transmitted in the slot bundles or windows, and the transmission order of the DCI in each slot may be implicitly indicated by the position of each slot in each slot bundle or window or by the CRC, DMRS for each DCI or the CORESET in which each DCI is located.

Optionally, Step 302 includes:

upon receipt of an acknowledgment (ACK) transmitted by the UE, activating or deactivating the target BWP in x slots after receiving the ACK, wherein the ACK is fed back by the UE which received the DCI, and x is an integer greater than or equal to 1.

In this step, after the transmission of one or more DCI to the UE by the base station is completed, or during the transmission of the one or more DCI, upon receipt of an acknowledgment (ACK) transmitted by the UE, the base station may start to activate or deactivate the target BWP in the X slots after the reception of the ACK.

Optionally, the ACK is feedback information fed back by the UE to the base station when the UE receives the DCI transmitted by the base station, where x is an integer greater than or equal to 1.

Further, if the base station receives a Negative Acknowledgment (NACK) after a certain transmission of DCI by the base station, the base station may continue to send DCI to the UE in a slot next to the slot in which the NACK is received, where the NACK is feedback information transmitted to the base station when the UE does not successfully receive the DCI.

If the ACK transmitted by the UE is received after k times of transmission of DCI to the UE, the transmission of DCI to the UE is then stopped, wherein k is an integer greater than or equal to 1, and smaller than or equal to the preset number of transmission K.

In this way, the base station may perform detection, and, upon receipt of the NACK, it may continue to send the DCI to the UE; upon receipt of the ACK, it may stop the transmission of DCI to reduce the data throughput.

In the present embodiment, by transmitting the DCI including information of the target BWP for activating or deactivating the target BWP at least once, the base station can notify the UE of the information for activating or deactivating the target BWP, so that the UE can switch to the target BWP in time, and the probability of missing or false detection of the DCI including the target BWP information by the UE can be reduced by transmitting the DCI at least once, thereby improving the probability that the UE correctly switches to the target BWP. The base station may send PDCCH signals to the UE one or more times to enhance the connection between the base station and the UE, and thus improve the reliability of the PDCCH.

Figure 4:
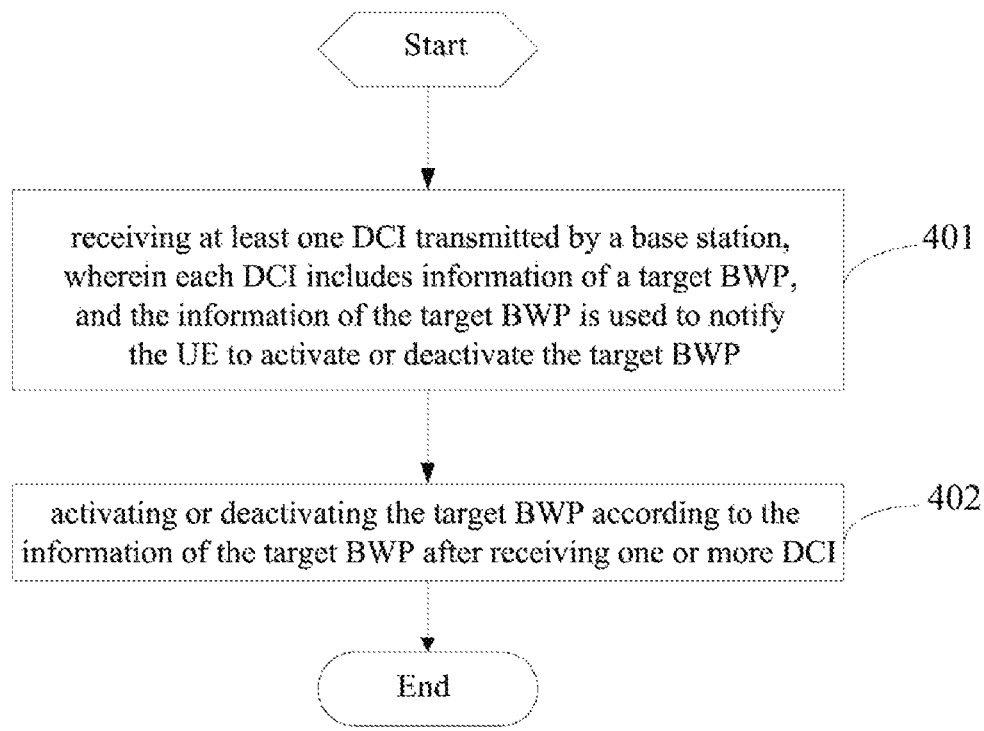
FIG. 4 is a flow chart of another method for controlling BWP according to an embodiment of the present disclosure.

Referring to FIG. 4, which is a flow chart of another method for controlling BWP according to an embodiment of the present disclosure. The method is applicable to a UE. As shown in FIG. 4, the method includes the following steps:

Step 401, receiving at least one DCI transmitted by a base station, wherein each DCI includes information of a target BWP for notifying the UE to activate or deactivate the target BWP.

In this step, the UE may also receive from the base station at least one DCI transmitted by the base station so as to know which BWP is needed to activate or deactivate, i.e., to know the target BWP to be activated or deactivated.

Optionally, each DCI includes the information of the target BWP which the UE needs to activate or deactivate, and the information of the target BWP in each DCI is used to notify the UE to activate or deactivate the target BWP.

Optionally, the information of the target BWP in each DCI may include relevant information of the target BWP to be activated or deactivated, such as information for specifically indicating which BWP is to be activated or deactivated, and may also include information about the bandwidth or frequency of the BWP.

Optionally, activating the target BWP may be starting the target BWP, so that the UE can work on the target BWP and can perform data transmission with the base station; deactivating the target BWP may be shutting-down the target BWP or release the working state of the target BWP if the UE does not need to work on the target BWP, so that the data transmission between the UE and the base station is no longer performed through the target BWP.

In this way, the UE may know the target BWP to be activated or deactivated by receiving the DCI transmitted by the base station carrying the information including the target BWP for activating or deactivating the target BWP, so that the UE can switch to the target BWP in time, and the probability of missing or false detection of the DCI including the target BWP information by the UE can be reduced by receiving the DCI multiple times, thereby improving the probability that the UE correctly switches to the target BWP.

Step 402, activating or deactivating the target BWP according to the information of the target BWP after receiving one or more DCI.

In this step, after receiving one or more DCI, the UE may activate or deactivate the target BWP according to the information of the target BWP in the received DCI.

Optionally, the UE activate or deactivate the target BWP after receiving one or more DCI, which may means that: when the data transmission between the base station and the UE, which may be implemented through a wireless or a wired connection, needs to be performed or does not need to be performed, that is to say, when the UE needs to work on the target BWP or does not need to work on the target BWP, the base station may notify the UE to activate the target BWP or to deactivate the target BWP, so as to establish a connection with the base station through the target BWP or disconnect from the base station.

Optionally, in order to ensure the accuracy of the detection, the UE activating or deactivating the target BWP according to the information of the target BWP after receiving multiple DCI may be the case that the UE confirms detection of the received DCI including the information of the target BWP when k DCIs have been received, where k is the preset number of the received DCI transmitted by the base station, k is greater than or equal to 1, and less than or equal to K, and K is the number of transmission of the DCI preset by the base station.

According to the method for controlling BWP provided by the embodiment of the present disclosure, the information about the target BWP to be activated or deactivated is obtained by receiving, at least once, the DCI of the target BWP information for activating or deactivating the target BWP, transmitted by the base station, so that the UE can switch to the target BWP in time, and the probability of missing or false detection of the DCI including the target BWP information by the UE can be reduced by receiving the DCI at least once, thereby improving the probability that the UE correctly switches to the target BWP.

Figure 5:
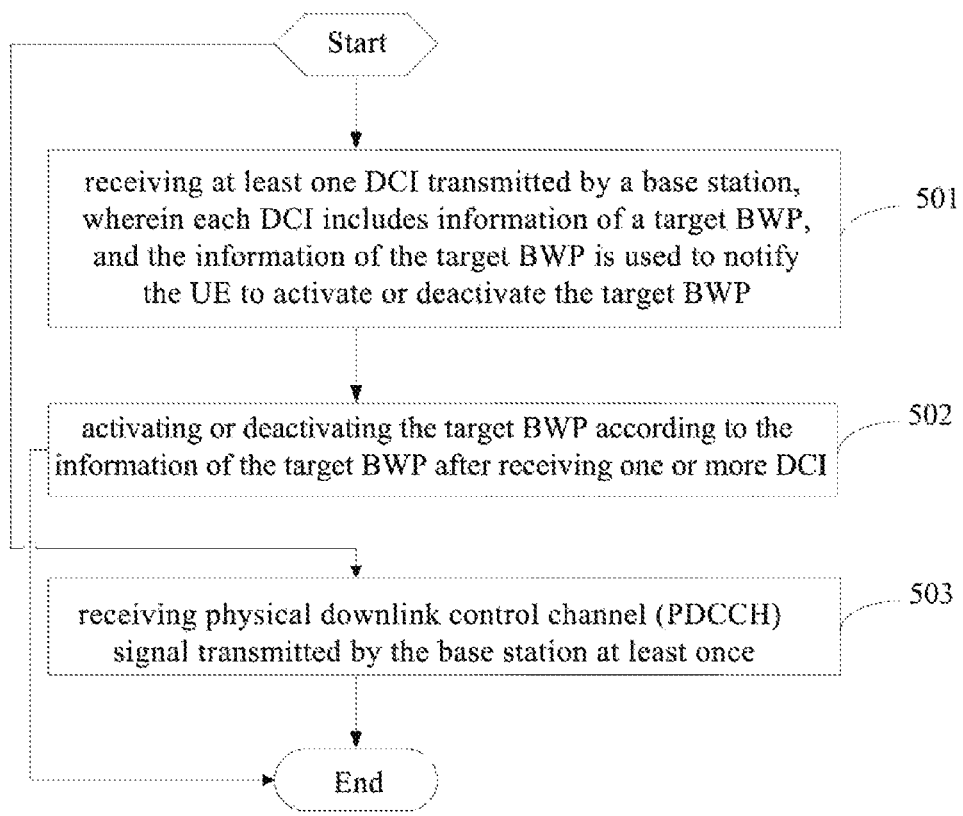
FIG. 5 is a flow chart of another method for controlling BWP according to an embodiment of the present disclosure.

Referring to FIG. 5, which is a flow chart of another method for controlling BWP according to an embodiment of the present disclosure. The method is applicable to a UE. As shown in FIG. 5, the method includes the following steps:

Step 501, receiving at least one DCI transmitted by a base station, wherein each DCI includes information of a target BWP for notifying the UE to activate or deactivate the target BWP.

In this step, the UE may receive from the base station at least one DCI transmitted by the base station so as to know which BWP is needed to activate or deactivate, i.e., to know the target BWP to be activated or deactivated.

Optionally, each DCI includes the information of the target BWP which the UE needs to activate or deactivate, and the information of the target BWP in each DCI is used to notify the UE to activate or deactivate the target BWP.

Optionally, the information of the target BWP in each DCI may include relevant information of the target BWP to be activated or deactivated, such as information for specifically indicating which BWP is to be activated or deactivated, and may also include information about the bandwidth or frequency of the BWP.

Optionally, activating the target BWP may be starting the target BWP, so that the UE can work on the target BWP and perform data transmission with the base station; deactivating the target BWP may be shutting-down the target BWP or release the working state of the target BWP if the UE does not need to work on the target BWP, so that the data transmission between the UE and the base station is no longer performed through the target BWP.

In this way, the UE may know the target BWP to be activated or deactivated by receiving the DCI transmitted by the base station carrying the information including the target BWP for activating or deactivating the target BWP, so that the UE can switch to the target BWP in time, and the probability of missing or false detection of the DCI including the target BWP information by the UE can be reduced by receiving the DCI multiple times, thereby improving the probability that the UE correctly switches to the target BWP.

Step 502, activating or deactivating the target BWP according to the information of the target BWP after receiving one or more DCI.

In this step, after receiving one or more DCI, the UE may activate or deactivate the target BWP according to the information of the target BWP in the received DCI.

Optionally, the UE activate or deactivate the target BWP after receiving one or more DCI, which means: when the data transmission between the base station and the UE, which may be implemented through a wireless or a wired connection, needs to be performed or does not need to be performed, that is to say, when the UE needs to work on the target BWP or does not need to work on the target BWP, the UE may activate or deactivate the target BWP, so as to establish a connection with the base station through the target BWP or disconnect from the base station.

Optionally, in order to ensure the accuracy of the detection, the UE activating or deactivating the target BWP according to the information of the target BWP after receiving multiple DCI may be the case that the UE confirms detection of the received DCI including the information of the target BWP when k DCIs have been received, where k is the preset number of the received DCI transmitted by the base station, k is greater than or equal to 1, and less than or equal to K, and K is the number of transmission of the DCI preset by the base station.

Step 503, receiving PDCCH signal transmitted by the base station at least once.

In this step, the UE may receive PDCCH signal transmitted by the base station at least once through the PDCCH.

Optionally, the information in the received PDCCH signal transmitted by the base station may be information received by the UE other than the DCI including the target BWP information transmitted by the base station, such as information for carrying scheduling and other control information, which may specifically include a transmission format, a resource allocation, an uplink scheduling permission, a power control, and an uplink retransmission information, etc.

By receiving the PDCCH signal transmitted by the base station multiple times, the UE may enhance the reliability of the PDCCH by enhancing the connection between the base station and the UE. For example, in the downlink URLLC service transmission, the reliability of receiving the PDCCH by the UE may be improved by continuously receiving PDCCH signals multiple times. The PDCCH signal received in each transmission may be a repetition of exactly the same content, or may be an initial transmission version and a corresponding redundancy version. The PDCCH signal for each transmission may use the same resource, or may be performed on different control resource sets (CORESETs), and may also use different Cyclic Redundancy Check (CRC) or Demodulation Reference Signal (DMRS), etc., to improve the accuracy of UE detection.

It should be noted that Step 503 is optical, that is to say, the present embodiment may be implemented without performing Step 503. Furthermore, the performing order of Step 503 and Steps 501 and 502 is not limited. For example, Step 305 may be performed simultaneously with Step 501 or Step 502, as shown in FIG. 5, which means Step 503 and Step 501 and/or 502 are independent steps, that is, the solution of Step 501 and/or Step 502 can be achieved without Step 503; alternatively, Step 503 may be performed after Step 502; alternatively, Step 503 may be performed before Step 501.

Optionally, the information of the target BWP includes an index for indicating the target BWP.

Optionally, the index may be information for indicating which BWP the UE specifically activates or deactivates. Different indexes may indicate different BWPs.

Optionally, the DCI received by the UE is a UE specific DCI, a group common DCI, a scheduling DCI or a configured grant DCI, wherein the UE specific DCI, the group common DCI, the scheduling DCI or the configured grant DCI includes therein an information field of information for indicating the target BWP: or the DCI transmitted to the UE is a DCI (separate DCI) dedicated to activating or deactivating the target BWP.

Optionally, the DCI received by the UE that is transmitted to the UE by the base station may be one of the UE specific DCI, the group common DCI, the scheduling DCI or the configured grant DCI, and the UE specific DCI, the group common DCI, the scheduling DCI or the configured grant DCI received by the UE includes therein an information field of information for indicating the target BWP. The information for indicating the target BWP may be information for indicating which BWP the target BWP is, and may also include information for indicating the bandwidth and frequency of the target BWP. Furthermore, the UE specific DCI, the group common DCI, the scheduling DCI or the configured grant DCI received by the UE may also include together therein some information fields that the base station needs to send to the UE, such as scheduling information. That is to say, the information indicating the target BWP may be transmitted to the UE through the DCI together with other information. In the DCI received by the UE multiple times, among the contents of the DCI transmitted each time, only the information for indicating the target BWP is identical, and other information may be different.

Optionally, the separate DCI that is dedicated to activating or deactivating the target BWP may be a separate DCI received by the UE for activating or deactivating the target BWP only. The separate DCI includes only relevant information of the target BWP, and does not include other information, and the separate DCI is only used to indicate the information of the target BWP. In the separate DCI received by the UE multiple times, the contents of the DCI received each time may be identical, or may be different Redundancy Version (RV).

Optionally, the information of the target BWP is used to indicate the target BWP in a BWP set that is configured for the UE by the base station, the BWP set includes N BWPs, wherein N is an integer greater than or equal to 1.

Optionally, the information of the target BWP is used to indicate the target BWP that the UE needs to activate or deactivate, the target BWP is a BWP in the BWP set configured for the UE by the base station, the BWP set includes N BWPs, each BWP has its respective index, and the index for each BWP may be different.

Optionally, N is an integer greater than or equal to 1.

Optionally, each DCI indicates the index of the target BWP by using N or M×ceil($\log_2$ N) bits, wherein M is an integer greater than or equal to 1, and less than or equal to N, and the ceil is a rounding up function.

Optionally, M is the maximum number of BWPs that the UE can activate or deactivate at the same time.

Further, in order that the target BWP may be represented more concisely, the smaller one of N and the product of M×ceil($\log_2$ N) may be used to represent the BWPs in the BWP set, and the target BWP in the BWP set.

For example, if the number of the target BWP that the UE can activate or deactivate at the same time is 1, i.e., M is 1, and there are 5 BWPs in the configured BWP set, then (ceil($\log_2$ 5)) bits, i.e., 3 bits, are needed to indicate each BWP, for example, "000" indicates BWP1, "001" indicates BWP2, etc.

When the UE can activate or deactivate 2 or more target BWPs at the same time, the target BWP that needs to be activated or deactivated can be represented by min{N, M×ceil($\log_2$ N)} bits. For example, if the UE can activate 2 target BWPs at the same time (i.e., M is 2), and there are 5 BWPs in the BWP set configured for the UE by the base station (i.e., N is 5), then, by calculation, the number obtained by multiplying M by ceil($\log_2$ N) is 6. In order to make a concise representation, each BWP in the BWP set can be represented by 5 bits, thereby representing two BWPs in the target BWP, such as using "01010" to indicate that BWP2 and BWP4 are simultaneously activated or deactivated, where "1" in "01010" indicates activation or deactivation, and the position where "1" is located indicates a certain BWP.

Further, in the above example, in a case that M is 2 and N is 8, by calculation, the number obtained by multiplying M by ceil($\log_2$ 8) is 6. Thus, the BWP can be indicated by using 6 bits, such as using "001011" to indicate that BWP2 and BWP4 are simultaneously activated or deactivated. Here, "001" may represent BWP2, "011" may represent BWP4; each BWP may be represented by (ceil($\log_2$ 8)) bits, i.e., 3 bits, and M=2. Thus, the combination thereof is "001011", which is used to indicate that BWP2 and BWP4 needs to be activated or deactivated.

Optionally, each DCI includes indication information.

Optionally, the indication information included in each DCI is used to indicate a timing for activating or deactivating the target BWP; or the indication information included in each DCI is used to indicate a transmission order of the DCI.

Further, the indication information included in each DCI may include both information for indicating the timing for activating or deactivating the target BWP and information for indicating the transmission order of the DCI.

In this way, the indication information in each DCI received by the UW can enable the UE to know a slot for activating or deactivating the target BWP by using the indication information when receiving the DCI.

Optionally, at least one of a cyclic redundancy check (CRC) code distinct to each DCI, a demodulation reference signal (DMRS) distinct to each DCI, or a distinct control source set (CORESET) in which each DCI is located is used to implicitly indicate the slot for activating or deactivating the target BWP, and/or the transmission order of the DCI.

Optionally, the CRC distinct to each DCI, the DMRS distinct to each DCI, or the CORESET in which each DCI is located may means that each DCI has multiple different CRCs or multiple different DMRSs, and each CRC of the multiple different CRCs is distinct or each DMRS of the multiple different DMRSs is distinct. The distinct CORESET in which each DCI is located may means that each DCI may be in a distinct CORESET, and each of the CORESETs is distinct. Therefore, the slot for activating or deactivating the target BWP, and/or the transmission order of the DCI may be implicitly indicated by using a distinct CRC for each DCI, or a distinct DMRS for each DCI, or a distinct CORESET in which each DCI is located.

In this way, the slot for activating or deactivating the target BWP, and/or the transmission order of the DCI may be implicitly indicated by using a distinct CRC for each DCI, or a distinct DMRS for each DCI, or a distinct CORESET in which each DCI is located, so that the UE may know, when receiving the DCI, the slot for activating or deactivating the target BWP, and/or the order of the received DCI by using different CRC, DMRS or CORESET without other additional signaling.

Optionally, the indication information included in each DCI is a count value, and a count value included in a retransmitted DCI is a count value for an initially transmitted DCI plus or minus the number of retransmissions.

Optionally, the count value may be a count value indicating the number of transmission of each DCI, and the count value for each transmission of the DCI may be represented by the count value for the last transmission of the DCI minus 1 or plus 1.

If the count value included in an initially transmitted DCI is K, that is, the count value for the DCI that is transmitted first time is K, the count value included in a retransmitted DCI may be K minus the number of retransmission, where K is the number of transmission of the DCI preset by the base station, and is an integer greater than or equal to 1.

Further, if the count value included in an initially transmitted DCI is K, the timing for activating or deactivating the target BWP may be a $h^{th}$ slot after (n+the received count value−1) slots, where n represents a receiving slot in which the UE receives the DCI, the received count value is the count value included in the DCI received by the UE, and h is an integer greater than or equal to 1.

For example, if the UE receives the DCI at the time of initial transmission, and the count value at the initial transmission is K, then the UE may start to activate the target BWP in the $h^{th}$ slot after (n+K−1) slots; if the UE receives the DCI at the time of the first retransmission, and the count value at the first retransmission may be (K−1), then the UE may start to activate the target BWP in the $h^{th}$ slot after (n+K−2) slots: if the UE receives the DCI at the time of the last retransmission, and the count value at the last retransmission is 1, then the UE may start to activate the target BWP in the $h^{th}$ slot after the UE receives the DCI.

If the count value included in the initially transmitted DCI is 1, that is, the count value for the DCI transmitted at the first time is 1, then the count value included in the retransmitted DCI is (1+the number of retransmission).

Further, if the count value included in the initially transmitted DCI is 1, then the timing for activating or deactivating the target BWP may be a $h^{th}$ slot after (n+K−the received count value) slots, where n represents a receiving slot in which the UE receives the DCI, the received count value is the count value included in the DCI received by the UE or may be considered as the count value included in each DCI as transmitted, and h is an integer greater than or equal to 1, where K is the number of transmitting the DCI preset by the base station, and is an integer greater than or equal to 1.

For example, if the UE receives the DCI at the time of initial transmission, and the count value at the initial transmission is 1, then it is indicated that the UE may start to activate the target BWP in the $h^{th}$ slot after (n+K−1) slots; if the UE receives the DCI at the time of the first retransmission, that is, the DCI received by the UE is the one that is transmitted by the base station for the second time, and the count value at the first retransmission may be 2, then it is indicated that the UE may start to activate the target BWP in the $h^{th}$ slot after (n+K−2) slots; if the UE receives the DCI at the time of the last retransmission, and the count value at the last retransmission is K, then the UE may start to activate the target BWP in the $h^{th}$ slot after the UE receives the DCI.

Optionally, Step 501 includes:

receiving k DCIs transmitted by the base station, wherein k is an integer less than or equal to K, and K is a number of transmitting the DCI preset by the base station, each DCI includes the information of the target BWP, and the information of the target BWP in each DCI is used to notify the UE to activate or deactivate the target BWP.

In this step, the UE may receive k DCIs transmitted from the base station, and each DCI includes the information of the target BWP, and the information of the target BWP in each DCI is used to notify the UE to activate or deactivate the target BWP.

Optionally, k is an integer less than or equal to K, and K is the number of transmission of DCI preset by the base station.

In this way, the UE confirms the reception of DCI by receiving k DCIs, which can improve the accuracy of the UE detecting the received DCI, and improve the reliability of the UE receiving the information of activating or deactivating the target BWP.

Further, Step 502 includes:

after receiving the k DCIs, activating or deactivating the target BWP according to an index of one or more of the received k DCIs, in an activation or deactivation slot indicated by the indication information of this DCI, or in an activation or deactivation slot corresponding to the transmission order of this DCI indicated by the indication information of this DCI.

In this step, after the UE receives the k DCIs transmitted by the base station, the UE may select one or more of the received k DCIs, and activate or deactivate the target BWP according to the index of the selected DCI in the activation or deactivation slot indicated by the indication information of this DCI; or, the UE may activate or deactivate the target BWP according to the index of the selected DCI in the activation or deactivation slot corresponding to the transmission order of the DCI indicated by the indication information of this DCI.

Optionally, the activation or deactivation slot indicated by the indication information of the DCI may be an explicit and specific slot.

Optionally, the step of receiving the k DCIs transmitted by the base station includes:

receiving the k DCIs transmitted by the base station in different slots, wherein the slot in which each DCI is located implicitly indicates a transmission order of the DCI.

Optionally, the expression that the UE receives the k DCIs transmitted by the base station in different slots may means that the UE receives the k DCIs transmitted by the base station in a slot interval of different slot bundle or different slot window, and the slot bundle or slot window may be a slot interval composed of a plurality of different and consecutive plurality of slots.

The slot intervals may be formed by dividing the slot of the original BWP by the base station into multiple slot intervals. Each of the slot interval forms one slot bundle or one slot window. Since each slot has a fixed position in a corresponding slot bundle or slot window, the transmission order of the DCI in each slot may be implicitly indicated by the position of each slot in each slot bundle or slot window. Wherein the transmission order is similar to the count value in each DCI in the foregoing, and may be used to indicate which time the transmitted DCI is transmitted.

Optionally, the base station may divide the slot of the original BWP into the slot bundles or slot windows, and each of the slot bundles or slot windows includes therein K slots. In this way, the UE may receive the DCI transmitted by the base station in each slot bundle or slot window, and the slot in which the DCI is received each time may implicitly indicate the transmission order of this transmission of the DCI.

For example, if the base station needs to send the DCI to the UE for 3 times, the base station may obtain multiple slot bundles or slot windows by division, and each slot bundle or slot window has 3 slots. If the UE receives the DCI transmitted by the base station in the second slot bundle or slot window, and the DCI received by the UE is in the first position of the second slot bundle or window, then the UE can know that the received DCI is the DCI transmitted for the first time.

Optionally, each of the received DCI is identical, each DCI is transmitted in different slot, and the slot in which each DCI is located implicitly indicates a transmission order of the DCI; or, each of the received DCI has a distinct redundancy version, each DCI is transmitted in different slot, and the slot in which each DCI is located implicitly indicates a transmission order of the DCI.

Optionally, the case that each of the DCI received by the UE is identical may be the case that the content in the DCI received each time is identical, or may be the case that the indication information fore indicating the target BWP in the DCI transmitted each time is identical while the redundancy version of each DCI is distinct.

Optionally, the case that each DCI is transmitted in different slot, and the slot in which each DCI is located implicitly indicates the transmission order of the DCI may be case that, as described above, the base station divides the slot into multiple slot bundles or slot windows, the UE receives the DCI by the slot bundle or window, and implicitly indicates the transmission order of the DCI transmitted in each slot by using the position of the slot of the each received DCI in the slot bundle or window; or may be the case that the UE implicitly indicates the transmission order of the DCI transmitted in each slot by using the CRC, the DMRS of each DCI and the CORESET in which each DCI is located.

Optionally, the step of receiving the at least one DCI transmitted by the base station includes:

receiving, at an original BWP, the at least one DCI transmitted by the base station.

Optionally, the original BWP may be the BWP at which the UE currently establish the connection with the base station, or may be the original BWP in which the connection between the base station and the UE is located.

Further, after the step of activating or deactivating the target BWP according to the information of the target BWP after receiving one or more DCI, the method further includes:

receiving data transmitted by the base station in the target BWP.

In this step, after the UE activates the target BWP according to the information of the target BWP in the received DCI, the UE may receive, in the target BWP, the data transmitted by the base station.

The data transmitted by the base station may be certain data that is not received by the UE in a case that prior to the UE activating the target BWP, the base station has activated the target BWP and transmitted data to the UE.

Optionally, after the step of receiving the at least one DCI transmitted by the base station, the method includes:

transmitting an acknowledgment (ACK) to the base station, and stopping detection of the DCI.

In this step, during the process that the UE receives the DCI transmitted by the base station, if the UE has received k DCIs transmitted by the base station, the UE may send an acknowledgment (ACK) to the base station to notify the base station that it has received the DCI, and the UE can stop detecting the DCI. When stopping the detection of the DCI, the UE may further decide to activate or deactivate the target BWP immediately, and activate or deactivate the target BWP according to an activation or deactivation slot indicated by the indication information of the received DCI, or according to an activation or deactivation slot corresponding to the transmission order of the DCI indicated by the indication information of the received DCI.

Optionally, k is an integer greater than or equal to 1. Further, k is less than or equal to K, and K is the number of transmission of the DCI preset by the base station.

Optionally, the ACK is feedback information fed back by the UE to the base station when the UE receives the DCI transmitted by the base station.

Further, if the UE does not receive the DCI transmitted by the base station during the process that the base station sends the DCI to the UE for K times, the UE may send a Negative Acknowledgment (NACK) to the base station, and keep detecting until it detect the DCI transmitted by the base station. Then the UE sends an ACK to the base station and stops detecting the DCI. Optionally, the NACK is feedback information transmitted to the base station when the UE does not successfully receive the DCI.

In the present embodiment, by receiving the DCI of the target BWP information for activating or deactivating the target BWP transmitted by the base station, the UE can know the information about the target BWP to be activated or deactivated, so that the UE can switch to the target BWP in time, and the probability of missing or false detection of the DCI including the target BWP information by the UE can be reduced by receiving the DCI at least once, thereby improving the probability that the UE correctly switches to the target BWP. The UE can also enhance the reliability of the PDCCH by enhancing the connection between the base station and the UE by receiving the PDCCH signal transmitted by the base station one or more times.

Figure 6:
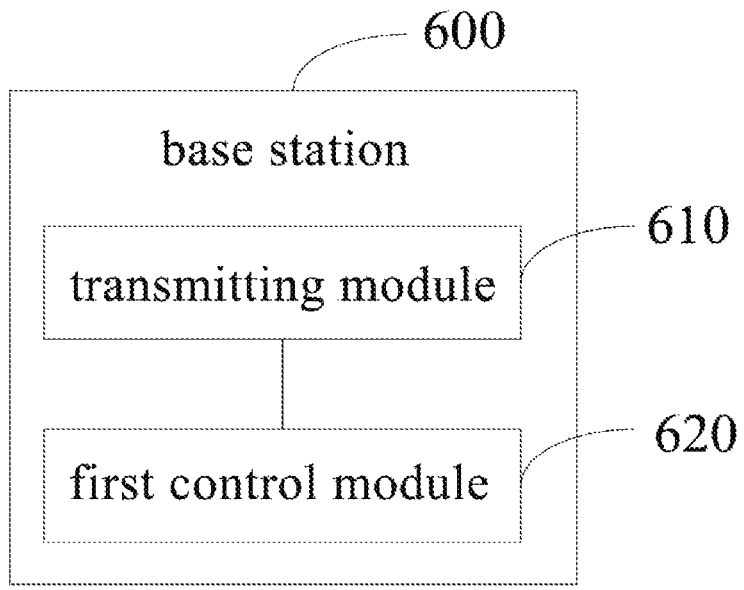
FIG. 6 is a structural diagram of a base station according to an embodiment of the present disclosure.

Referring to FIG. 6, which is a structural diagram of a base station according to an embodiment of the present disclosure. As shown in FIG. 6, the base station 600 includes:

a transmitting module 610 configured to send downlink control information (DCI) to a UE at least once, wherein each DCI includes information of a target BWP, and the information of the target BWP in each DCI is used to notify the UE to activate or deactivate the target BWP; and a first control module 620 configured to activate or deactivate the target BWP after one or more DCI are transmitted.

Optionally, the information of the target BWP includes an index for indicating the target BWP.

Optionally, the DCI transmitted to the UE is a UE specific DCI, a group common DCI, a scheduling DCI or a configured grant DCI, wherein the UE specific DCI, the group common DCI, the scheduling DCI or the configured grant DCI includes therein an information field of information for indicating the target BWP.

Alternatively, the DCI transmitted to the UE is a DCI dedicated to activating or deactivating the target BWP.

Figure 7:
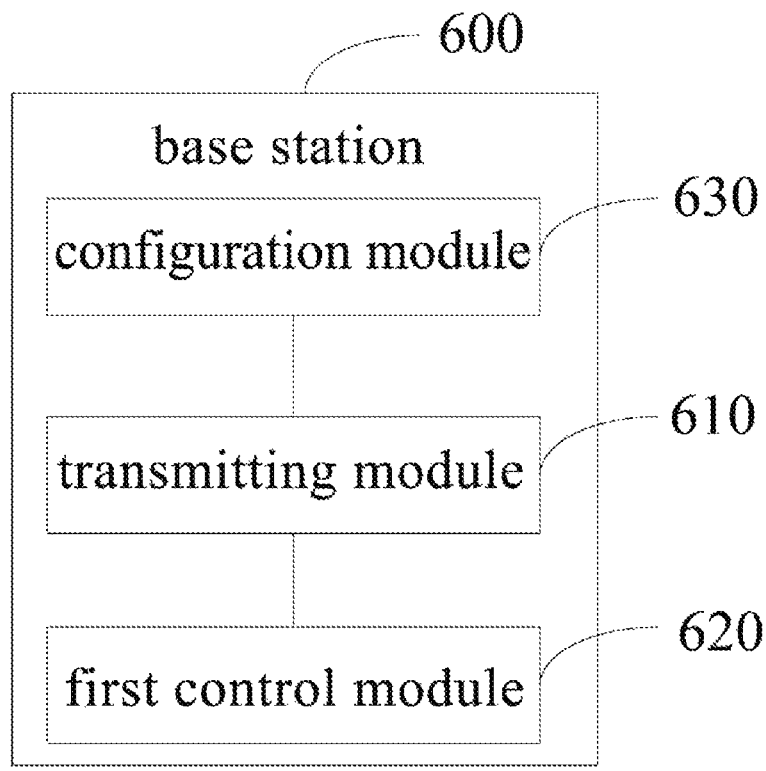
FIG. 7 is a structural diagram of another base station according to an embodiment of the present disclosure.

Optionally, as shown in FIG. 7, the base station further includes:

a configuration module 630 configured to configure a BWP set to the UE, the BWP set including N BWPs, wherein N is an integer greater than or equal to 1.

Optionally, each DCI indicates the index of the target BWP by using N or M×ceil($log_2$ N) bits, wherein M is an integer greater than or equal to 1, and less than or equal to N, and the ceil is a rounding up function.

Optionally, each DCI includes indication information; wherein the indication information included in each DCI is used to indicate a timing for activating or deactivating the target BWP; or the indication information included in each DCI is used to indicate a transmission order of the DCI.

Optionally, the indication information included in each DCI is a count value, and a count value included in a retransmitted DCI is a count value for an initially transmitted DCI plus or minus the number of retransmissions.

Optionally, the transmitting module 610 is further configured to send the downlink control information (DCI) to the UE for K times, wherein K is a preset number of transmission, and is an integer greater than or equal to 1.

Further, the first control module 620 is further configured to activate or deactivate the target BWP after the transmission of DCI for K times is completed.

Optionally, the transmitting module 610 is further configured to send the DCI to the UE for K times in different slots, wherein the slot in which each DCI is located implicitly indicates a transmission order of the DCI, K is a preset number of transmission, and is an integer greater than or equal to 1.

Optionally, the transmitting module 610 is further configured to send the DCI to the UE for K times at an original BWP, wherein K is a preset number of transmission, and is an integer greater than or equal to 1;

Further, the first control module 620 is further configured to activate or deactivate the target BWP if a first transmission of the DCI to the UE is completed.

Optionally, at least one of a cyclic redundancy check (CRC) code distinct to each DCI, a demodulation reference signal (DMRS) distinct to each DCI, or a distinct control source set (CORESET) in which each DCI is located is used to implicitly indicate a slot for activating or deactivating the target BWP, and/or a transmission order of the DCI.

Optionally, each DCI transmitted to the UE is identical, and is transmitted in different slot, the slot in which each DCI is located implicitly indicates a transmission order of the DCI.

Alternatively, each DCI that is transmitted to the UE has distinct redundancy version, and is transmitted in different slot, the slot in which each DCI is located implicitly indicates a transmission order of the DCI.

Optionally, the first control module 620 is further configured to, upon receipt of an acknowledgment (ACK) transmitted by the UE, activate or deactivate the target BWP in x slots after receiving the ACK, wherein the ACK is fed back by the UE which received the DCI, and x is an integer greater than or equal to 1.

It should be noted that, the present embodiment, which is an implementation of a network-side apparatus corresponding to the embodiment shown in FIG. 2 and/or FIG. 3, may be a base station in any implementation for the method embodiments of the embodiments of the present disclosure, and the specific implementation thereof may refer to the relevant descriptions of the embodiment shown in FIG. 2 and/or FIG. 3. Any implementation of a base station in the method embodiments of the embodiments of the present disclosure can be achieved by the above base station 600 in the present embodiment, and can obtain the same beneficial effect, which will not be described again in this embodiment in order to avoid repetition of the description.

The base station provided in the embodiment of the present disclosure notifies the UE of the information for activating or deactivating the target BWP by transmitting, at least once, the DCI including the target BWP information for activating or deactivating the target BWP, so that the UE can switch to the target BWP in time, and the probability of missing or false detection of the DCI including the target BWP information by the UE can be reduced by receiving the DCI at least once, thereby improving the probability that the UE correctly switches to the target BWP.

Figure 8:
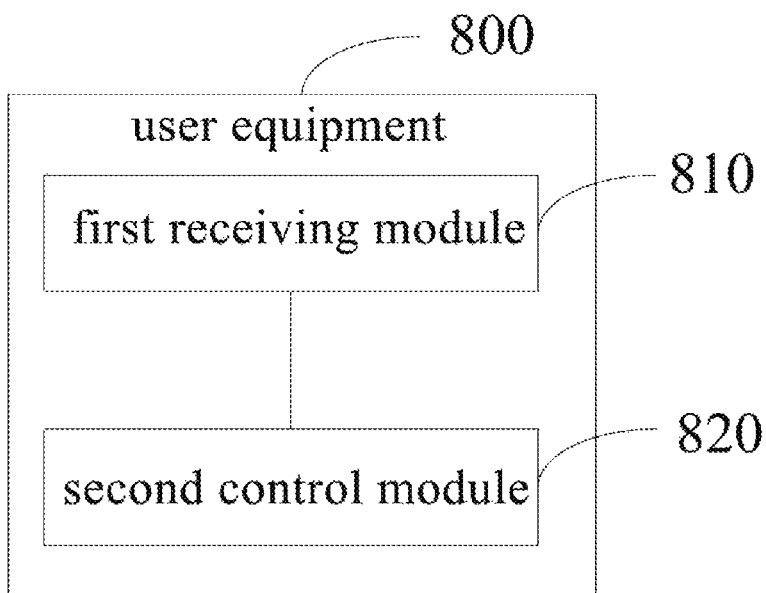
FIG. 8 is a structural diagram of a user equipment according to an embodiment of the present disclosure.

Referring to FIG. 8, which is a structural diagram of a UE according to an embodiment of the present disclosure. As shown in FIG. 8, the UE 800 includes:

a first receiving module 810 configured to receive at least one DCI transmitted by a base station, wherein each DCI includes information of a target BWP, and the information of the target BWP in each DCI is used to notify the UE to activate or deactivate the target BWP; and a second control module 820 configured to activate or deactivate the target BWP according to the information of the target BWP after receiving one or more DCI.

Optionally, the information of the target BWP includes an index for indicating the target BWP.

Optionally, the DCI received by the UE is a UE specific DCI, a group common DCI, a scheduling DCI or a configured grant DCI, wherein the UE specific DCI, the group common DCI, the scheduling DCI or the configured grant DCI comprises therein an information field of information for indicating the target BWP.

Alternatively, the DCI transmitted to the UE is a DCI dedicated to activating or deactivating the target BWP.

Optionally, the information of the target BWP is used to indicate the target BWP in a BWP set that is configured for the UE by the base station, the BWP set includes N BWPs, wherein N is an integer greater than or equal to 1.

Optionally, each DCI indicates the index of the target BWP by using N or M×ceil(log$_2$ N) bits, wherein M is an integer greater than or equal to 1, and less than or equal to N, and the ceil is a rounding up function.

Optionally, each DCI includes indication information.

Optionally, the indication information included in each DCI is used to indicate a timing for activating or deactivating the target BWP.

Alternatively, the indication information included in each DCI is used to indicate a transmission order of the DCI.

Optionally, the indication information included in each DCI is a count value, and a count value comprised in a retransmitted DCI is a count value for an initially transmitted DCI plus or minus the number of retransmissions.

Optionally, the first receiving module 810 is further configured to receive k DCIs transmitted by the base station, wherein k is an integer less than or equal to K, and K is a number of transmitting the DCI preset by the base station, wherein each DCI includes the information of the target BWP, and the information of the target BWP in each DCI is used to notify the user equipment to activate or deactivate the target BWP.

Further, the second control module 820 is further configured to, after receiving the k DCIs, activate or deactivate the target BWP according to an index of one or more of the received k DCIs, in an activation or deactivation slot indicated by the indication information of this DCI, or in an activation or deactivation slot corresponding to the transmission order indicated by the indication information of this DCI.

Optionally, the first receiving module is further configured to receive the k DCIs transmitted by the base station in different slots, wherein the slot in which each DCI is located implicitly indicates a transmission order of the DCI, wherein each DCI includes the information of the target BWP, and the information of the target BWP in each DCI is used to notify the user equipment to activate or deactivate the target BWP.

Optionally, at least one of a cyclic redundancy check (CRC) code distinct to each DCI, a demodulation reference signal (DMRS) distinct to each DCI, or a distinct control source set (CORESET) in which each DCI is located is used to implicitly indicate a slot for activating or deactivating the target BWP, and/or a transmission order of the DCI.

Optionally, each of the received DCI is identical, and is transmitted in different slot, the slot in which each DCI is located implicitly indicates a transmission order of the DCI.

Alternatively, each of the received DCI has distinct redundancy version, and is transmitted in different slot, the slot in which each DCI is located implicitly indicates a transmission order of the DCI.

Optionally, the first receiving module 810 is further configured to receive the at least one DCI transmitted by the base station from an original BWP, wherein each DCI includes the information of the target BWP, and the information of the target BWP in each DCI is used to notify the user equipment to activate or deactivate the target BWP.

Figure 9:
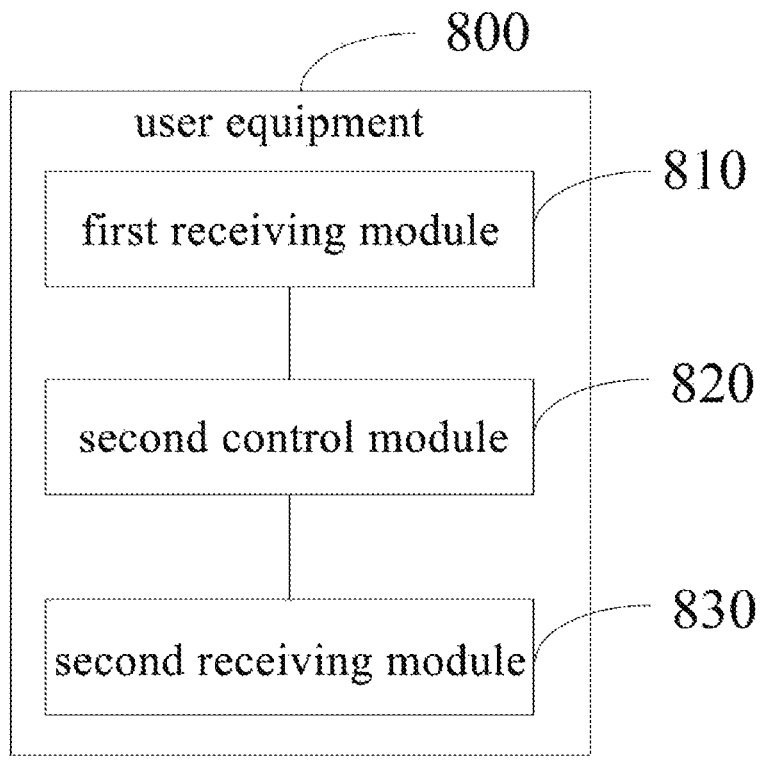
FIG. 9 is a structural diagram of another user equipment according to an embodiment of the present disclosure.

Further, as shown in FIG. 9, the UE 800 further includes:

a second receiving module 830 configured to receive data transmitted by the base station in the target BWP.

Figure 10:
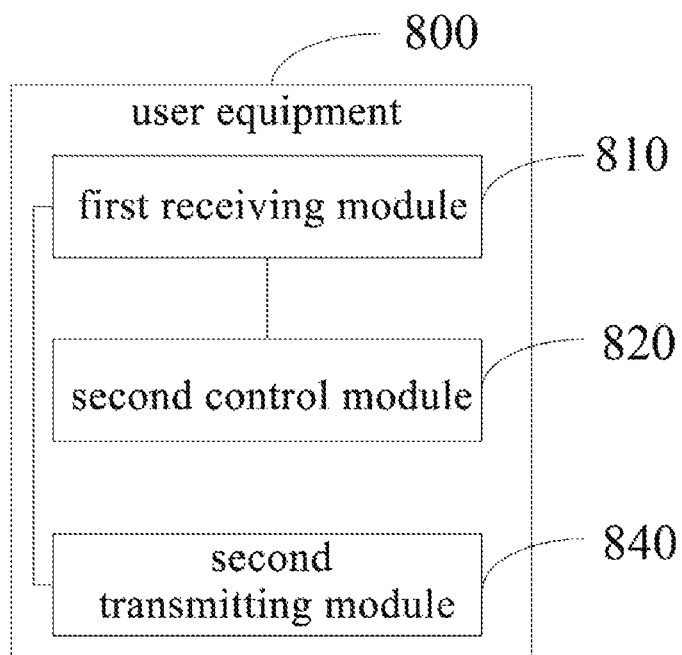
FIG. 10 is a structural diagram of another user equipment according to an embodiment of the present disclosure.

Optionally, as shown in FIG. 10, the UE 800 further includes:

a second transmitting module 840 configured to send an acknowledgment (ACK) to the base station, and stopping detection of the DCI.

It should be noted that, the present embodiment, which is an implementation of a network-side apparatus corresponding to the embodiment shown in FIG. 4 and/or FIG. 5, may be a UE in any implementation for the method embodiments of the embodiments of the present disclosure, and the specific implementation thereof may refer to the relevant descriptions of the embodiment shown in FIG. 4 and/or FIG. 5. Any implementation of a base station in the method embodiments of the embodiments of the present disclosure can be achieved by the above UE 800 in the present embodiment, and can obtain the same beneficial effect, which will not be described again in this embodiment in order to avoid repetition of the description.

The UE provided by the embodiment of the present disclosure gets the information for activating or deactivating the target BWP by receiving the DCI including the target BWP information for activating or deactivating the target BWP which is transmitted by the base station at least once, so that the UE can switch to the target BWP in time, and the probability of missing or false detection of the DCI including the target BWP information by the UE can be reduced by receiving the DCI at least once, thereby improving the probability that the UE correctly switches to the target BWP.

Figure 11:
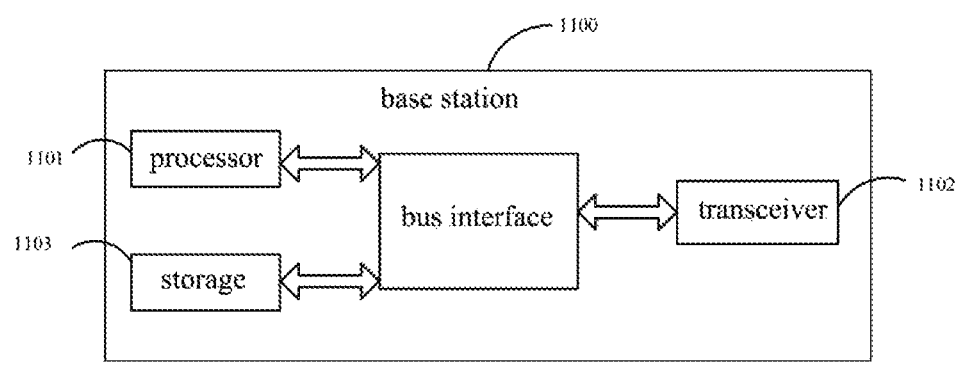
FIG. 11 is a structural diagram of another base station according to an embodiment of the present disclosure.

Referring to FIG. 11, which is a structural diagram of another base station according to an embodiment of the present disclosure. As shown in FIG. 11, the base station 1100 includes a processor 1101, a transceiver 1102, a storage 1103 and a bus interface, wherein:

in the embodiment of the present disclosure, the base station 1100 further includes a computer program which is stored on the storage 1103 and is capable of running on the processor 1101. The computer program, when executed by the processor 1101, implements the steps as follows:

transmitting downlink control information (DCI) to a UE at least once, wherein each DCI includes information of a target BWP for notifying the UE to activate or deactivate the target BWP; and activating or deactivating the target BWP after one or more DCI are transmitted.

Optionally, the transceiver 1102 is configured to receive and transmit data under the control of the processor 1101, and includes at least two antenna ports.

In FIG. 11, the bus architecture may include any number of interconnected buses and bridges, specifically linked by various circuits of one or more processors represented by the processor 1101 and storage represented by the storage 1103. The bus architecture may also link various other circuits such as peripherals, voltage regulators, and power management circuits, which are well known in the art and, therefore, will not be further described herein. The bus interface provides an interface. The transceiver 1102 may be a plurality of elements, including a transmitter and a receiver, providing units for communicating with various other devices on a transmission medium. For different user equipment, the user interface 1104 may also be an interface capable of connecting required devices externally or internally, including but not limited to a keypad, a display, a speaker, a microphone, a joystick, and the like.

The processor 1101 is responsible for managing the bus architecture and general processing, and the storage 1103 may store data used by the processor 1101 when performing operations.

Optionally, the information of the target BWP includes an index for indicating the target BWP.

Optionally, the DCI transmitted to the UE is a UE specific DCI, a group common DCI, a scheduling DCI or a configured grant DCI, wherein the UE specific DCI, the group common DCI, the scheduling DCI or the configured grant DCI includes therein an information field of information for indicating the target BWP.

Alternatively, the DCI transmitted to the UE is a DCI dedicated to activating or deactivating the target BWP.

Optionally, before the step of transmitting to the UE the downlink control information (DCI) at least once, the computer program further achieves, when executed by the processor 1101, the following step:

configuring a BWP set to the UE, the BWP set including N BWPs, wherein N is an integer greater than or equal to 1.

Optionally, each DCI indicates the index of the target BWP by using N or M×ceil($\log_2$ N) bits, wherein M is an integer greater than or equal to 1, and less than or equal to N, and the ceil is a rounding up function.

Optionally, each DCI includes indication information;

wherein the indication information included in each DCI is used to indicate a timing for activating or deactivating the target BWP.

Alternatively, the indication information included in each DCI is used to indicate a transmission order of the DCI.

Optionally, the indication information included in each DCI is a count value, and a count value included in a retransmitted DCI is a count value for an initially transmitted DCI plus or minus the number of retransmissions.

Optionally, the computer program further achieves, when executed by the processor 1101, the following step:

transmitting the downlink control information (DCI) to the UE for K times, wherein K is a preset number of transmission, and is an integer greater than or equal to 1;

Further, the computer program further achieves, when executed by the processor 1101, the following step:

activating or deactivating the target BWP after the DCI has been transmitted for K times.

Optionally, the computer program further achieves, when executed by the processor 1101, the following step:

transmitting the DCI to the UE for K times in different slots, wherein the slot in which each DCI is located implicitly indicates a transmission order of the DCI.

Optionally, the computer program further achieves, when executed by the processor 1101, the following step:

transmitting the DCI to the UE for K times at an original BWP.

Further, the computer program further achieves, when executed by the processor 1101, the following step:

activating or deactivating the target BWP if a first transmission of the DCI to the UE is completed.

Optionally, at least one of a cyclic redundancy check (CRC) code distinct to each DCI, a demodulation reference signal (DMRS) distinct to each DCI, or a distinct control source set (CORESET) in which each DCI is located is used to implicitly indicate a slot for activating or deactivating the target BWP, and/or a transmission order of the DCI.

Optionally, each DCI transmitted to the UE is identical, and is transmitted in different slot, the slot in which each DCI is located implicitly indicates a transmission order of the DCI.

Alternatively, each DCI that is transmitted to the UE has distinct redundancy version, and is transmitted in different slot, the slot in which each DCI is located implicitly indicates a transmission order of the DCI.

Optionally, the computer program further achieves, when executed by the processor 1101, the following step:

upon receipt of an acknowledgment (ACK) transmitted by the UE, activating or deactivating the target BWP in x slots after receiving the ACK, wherein the ACK is fed back by the UE which received the DCI, and x is an integer greater than or equal to 1.

It should be noted that, the above base station 1100 in the present embodiment may be the base station of any implementation in the method embodiments in the embodiments of the present disclosure. Any implementation of a base station in the method embodiments in the embodiments of the present disclosure can be achieved by the above base station 1100 in the present embodiment, and can obtain the same beneficial effect, which will not be described here again.

Figure 12:
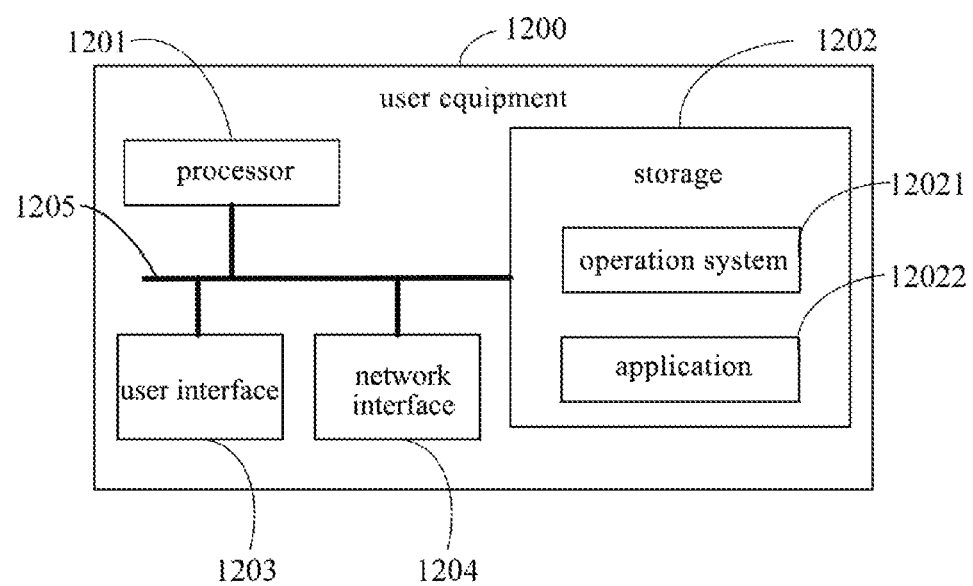
FIG. 12 is a structural diagram of another user equipment according to an embodiment of the present disclosure.

Referring to FIG. 12, which is a structural diagram of another UE according to an embodiment of the present disclosure. As shown in FIG. 12, the UE 1200 includes: at least one processor 1201, a storage 1202, at least one network interface 1204 and a user interface 1203. The various components in the UE 1200 are coupled together by a bus system 1205. It will be appreciated that the bus system 1205 is used to implement connection communication between these components. The bus system 1205 includes a power bus, a control bus, and a status signal bus in addition to the data bus. However, for clarity of description, various buses are collectively labeled as the bus system 1205 in FIG. 12.

Optionally, the user interface 1203 may include a display, a keyboard, or a pointing device (e.g., a mouse, a track ball, a touch pad, or a touch screen, etc.).

It is appreciated that the storage 1202 in the embodiment of the present disclosure may be a volatile memory or a non-volatile memory, or may include both the volatile memory and the non-volatile memory. The non-volatile memory may be a read-only memory (ROM), a Programmable ROM (PROM), an Erasable PROM (EPROM), an Electric EPROM (EEPROM), or a flash memory. The volatile memory can be a Random Access Memory (RAM) that acts as an external cache. By way of example and not limitation, many forms of RAM are available, such as Static RAM (SRAM), Dynamic RAM (DRAM), Synchronous DRAM (SDRAM), Double Data Rate SDRAM (DDRS-DRAM), Enhanced SDRAM (ESDRAM), Synchlink DRAM (SDRAM), and Direct Rambus RAM (DRRAM). The memory 1202 of the systems and methods described herein is intended to include, without being limited to, these and any other suitable types of memories.

In some implementations, the storage 1202 stores elements, executable modules or data structures, or subsets thereof, or expansion sets thereof: an operating system 12021 and an application 12022.

Optionally, the operation system 12021 includes various system programs, such as a framework layer, a core library layer, a driver layer, etc., for implementing various basic services and processing hardware-based tasks. The application 12022 includes various applications, such as a media player, a browser, etc., for implementing various application services. The program for implementing the methods of the embodiments of the present disclosure may be included in the application 12022.

In the embodiment of the present disclosure, the UE 1200 further includes a computer program which is stored in the storage 1202 and is capable of running on the processor 1201, specifically, may be the computer program in the application 12022. The computer program achieves, when executed by the processor 1201, the following steps:

receiving at least one DCI transmitted by a base station, wherein each DCI includes information of a target BWP, and the information of the target BWP in each DCI is used to notify the UE to activate or deactivate the target BWP; and activating or deactivating the target BWP according to the information of the target BWP after one or more DCI are received.

The methods disclosed in the above embodiments of the present disclosure may be applied to the processor 1201 or implemented by the processor 1201. The processor 1201 may be an integrated circuit chip with signal processing capabilities. In the implementation process, each step of the foregoing methods may be completed by a hardware integrated logic circuit in the processor 1201 or instructions in a form of software. The processor 1201 may be a general purpose processor, a Digital Signal Processor (DSP), an Application Specific Integrated Circuit (ASIC), a Field Programmable Gate Array (FPGA), or other programmable logic devices, discrete gates or transistor logic devices, discrete hardware components. The methods, steps, and logical block diagrams disclosed in the embodiments of the present disclosure may be implemented or carried out. The general purpose processor may be a microprocessor or any conventional processor or the like. The steps of the methods disclosed in connection with the embodiments of the present disclosure may be directly performed by the hardware decoding processor, or may be performed by a combination of hardware and software modules in the decoding processor. The software modules can be located in a conventional storage medium such as a random access memory, a flash memory, a read only memory, a programmable read only memory or an electrically erasable programmable memory, registers, and the like. The storage medium is located in the storage 1202, and the processor 1201 reads the information in the storage 1202 and completes the steps of the above methods in combination with its hardware.

It will be appreciated that the embodiments described herein may be implemented in hardware, software, firmware, middleware, microcode, or a combination thereof. For a hardware implementation, the processing unit may be implemented in one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), general purpose processors, controllers, micro-controllers, microprocessors, other electronic units for performing the functions described herein or a combination thereof.

For a software implementation, the techniques described herein may be implemented by modules (e.g., procedures, functions, and so on) that perform the functions described herein. The software codes may be stored in a storage and executed by the processor. The storage may be implemented in the processor or external to the processor.

Optionally, the information of the target BWP includes an index for indicating the target BWP.

Optionally, the DCI received by the UE is a UE specific DCI, a group common DCI, a scheduling DCI or a configured grant DCI, wherein the UE specific DCI, the group common DCI, the scheduling DCI or the configured grant DCI includes therein an information field of information for indicating the target BWP.

Alternatively, the DCI transmitted to the UE is a DCI dedicated to activating or deactivating the target BWP.

Optionally, the information of the target BWP is used to indicate the target BWP in a BWP set that is configured for the UE by the base station, the BWP set comprises N BWPs, wherein N is an integer greater than or equal to 1.

Optionally, each DCI indicates the index of the target BWP by using N or M×ceil(log 2N) bits, wherein M is an integer greater than or equal to 1, and less than or equal to N, and the ceil is a rounding up function.

Optionally, each DCI includes indication information.

Optionally, the indication information included in each DCI is used to indicate a timing for activating or deactivating the target BWP; or the indication information included in each DCI is used to indicate a transmission order of the DCI.

Optionally, the indication information included in each DCI is a count value, and a count value included in a retransmitted DCI is a count value for an initially transmitted DCI plus or minus the number of retransmissions.

Optionally, the computer program further achieves, when executed by the processor 1201, the following step:

receiving k DCIs transmitted by the base station, wherein k is an integer less than or equal to K, and K is a number of transmitting the DCI preset by the base station.

Further, the computer program further achieves, when executed by the processor 1201, the following step:

after receiving the k DCIs, activating or deactivating the target BWP according to an index of one or more of the k DCIs, in an activation or deactivation slot indicated by the indication information of this DCI, or in an activation or deactivation slot corresponding to the transmission order indicated by the indication information of this DCI.

Optionally, the computer program further achieves, when executed by the processor 1201, the following step:

receiving the k DCIs transmitted by the base station in different slots, wherein the slot in which each DCI is located implicitly indicates a transmission order of the DCI.

Optionally, at least one of a cyclic redundancy check (CRC) code distinct to each DCI, a demodulation reference signal (DMRS) distinct to each DCI, or a distinct control source set (CORESET) in which each DCI is located is used to implicitly indicate a slot for activating or deactivating the target BWP, and/or a transmission order of the DCI.

Optionally, each of the received DCI is identical, and is transmitted in different slot, the slot in which each DCI is located implicitly indicates a transmission order of the DCI.

Alternatively, each of the received DCI has distinct redundancy version, and is transmitted in different slot, the slot in which each DCI is located implicitly indicates a transmission order of the DCI.

Optionally, the computer program further achieves, when executed by the processor 1201, the following step:

receiving the at least one DCI transmitted by the base station from an original BWP.

Further, the computer program further achieves, when executed by the processor 1201, the following step:

receiving data transmitted by the base station in the target BWP.

Optionally, the computer program further achieves, when executed by the processor 1201, the following step:

transmitting an acknowledgment (ACK) to the base station, and stopping detection of the DCI.

It should be noted that, the above UE 1200 in the present embodiment may be the UE of any implementation in the method embodiments in the embodiments of the present disclosure. Any implementation of a UE in the method embodiments in the embodiments of the present disclosure can be achieved by the above UE 1200 in the present embodiment, and can obtain the same beneficial effect, which will not be described here again.

An embodiment of the present disclosure further provides a base station including a storage, a processor, and a computer program which is stored on the storage and is capable of running on the processor, the computer program achieving, when executed by the processor, the steps in the method for controlling BWP provided by an embodiment of the present disclosure.

An embodiment of the present disclosure further provides a user equipment (UE) including a storage, a processor, and a computer program which is stored on the storage and is capable of running on the processor, the computer program achieving, when executed by the processor, the steps in the method for controlling BWP provided by an embodiment of the present disclosure.

An embodiment of the present disclosure further provides a computer readable storage medium, wherein the computer readable storage medium stores thereon a computer program which, when executed by a processor, achieves the steps in the method for controlling BWP applicable to a base station provided by an embodiment of the present disclosure.

An embodiment of the present disclosure further provides a computer readable storage medium, wherein the computer readable storage medium stores thereon a computer program which, when executed by a processor, achieves the steps in the method for controlling BWP applicable to a UE provided by an embodiment of the present disclosure.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different method to implement the described functions for each particular application, but such implementation should not be considered to be beyond the scope of the present disclosure.

A person skilled in the art can clearly understand that, for the convenience and brevity of the description, the specific working process of the systems, the devices and the units described above may refer to the corresponding processes in the foregoing method embodiments, and details are not described herein again.

In the embodiments provided by the present application, it should be understood that the disclosed devices and methods may be implemented in other manners. For example, the device embodiments described above are merely illustrative. For example, the division of the units is only a logical function division. In actual implementation, there may be other division manners, for example, multiple units or components may be combined or integrated into another system, or some features can be ignored or not executed. In addition, the coupling or direct coupling or communication connection shown or discussed herein may be an indirect coupling or communication connection through some interfaces, devices or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the objects of the solutions of the embodiments of the present disclosure.

In addition, functional units in various embodiments of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, a portion of the technical solution of the present disclosure that contributes in essence or to the related art or a part of the technical solution may be embodied in the form of a software product stored in a storage medium, including several instructions for causing a computer device (which may be a personal computer, a server, or a network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, or an optical disk, etc.

The above is only the specific implementation of the present disclosure. However, the scope of the present disclosure is not limited thereto. Any person skilled in the art can easily think of variations or substitutions within the technical scope of the disclosure, which should be covered within the protective scope of the present disclosure. Therefore, the protective scope of the present disclosure should be defined by the scope of the claims.

What is claimed is:

1. A method for controlling bandwidth part (BWP) applicable to a base station, comprising:
   transmitting downlink control information (DCI) to a user equipment (UE) at least once, wherein each DCI comprises information of a target BWP for notifying the UE to activate or deactivate the target BWP; and
   activating or deactivating the target BWP;
   wherein a slot for activating or deactivating the target BWP, and/or a transmission order of each DCI is implicitly indicated by at least one of a cyclic redundancy check (CRC) code of each DCI, a demodulation reference signal (DMRS) of each DCI, or a control source set (CORESET) in which the DCI is located.

2. The method according to claim 1, wherein the information of the target BWP comprises an index of the target BWP.

3. The method according to claim 1, wherein the DCI transmitted to the UE is a UE specific DCI, a group common DCI, a scheduling DCI or a configured grant DCI, wherein the UE specific DCI, the group common DCI, the scheduling DCI or the configured grant DCI comprises therein an information field of information for indicating the target BWP; or
   the DCI transmitted to the UE is a DCI dedicated to activating or deactivating the target BWP.

4. The method according to claim 1, wherein, prior to the step of transmitting the downlink control information (DCI) to the UE at least once, the method comprises:
   configuring a BWP set to the UE, the BWP set comprising N BWPs, wherein N is an integer greater than or equal to 1;
   wherein each DCI indicates the index of the target BWP by using N or M×ceil($\log_2$ N) bits, wherein M is an integer greater than or equal to 1, and less than or equal to N, and the ceil is a rounding up function.

5. The method according to claim 1, wherein each DCI comprises indication information;
   wherein the indication information is used to indicate a timing for activating or deactivating the target BWP; or
   the indication information is used to indicate a transmission order of the DCI.

6. The method according to claim 5, wherein the indication information is a count value, and a count value contained in a retransmitted DCI is a count value for an initially transmitted DCI plus or minus the number of retransmissions.

7. The method according to claim 1, wherein the step of transmitting the downlink control information (DCI) to the UE at least once comprises:
   transmitting the downlink control information (DCI) to the UE for K times, wherein K is a preset number of transmissions, and is an integer greater than or equal to 1;
   the step of activating or deactivating the target BWP comprises:
   activating or deactivating the target BWP after the DCI has been transmitted for K times.

8. The method according to claim 7, wherein the step of transmitting the DCI to the UE for K times comprises:
   transmitting the DCI to the UE for K times in different slots, wherein a transmission order of each DCI is implicitly indicated by the slot in which the DCI is located.

9. The method according to claim 7, wherein the step of transmitting the downlink control information (DCI) to the UE for K times comprises:
   transmitting the DCI to the UE for K times from an original BWP;
   the step of activating or deactivating the target BWP comprises:
   activating or deactivating the target BWP if a first transmission of the DCI to the UE is completed.

10. The method according to claim 1, wherein each DCI transmitted to the UE is identical, and is transmitted in different slots, a transmission order of the DCI is implicitly indicated by the slot in which the DCI is located; or
    each DCI transmitted to the UE has distinct redundancy version, and each DCI is transmitted in different slot, a transmission order of the DCI is implicitly indicated by the slot in which the DCI is located.

11. The method according to claim 1, wherein the step of activating or deactivating the target BWP after one or more DCI is transmitted comprises:
    upon receipt of an acknowledgment (ACK) transmitted by the UE, activating or deactivating the target BWP in x slots after receiving the ACK, wherein the ACK is fed back by the UE which received the DCI, and x is an integer greater than or equal to 1.

12. A method for controlling bandwidth part (BWP) applicable to a user equipment (UE), comprising:
    receiving at least one DCI transmitted by a base station, wherein each DCI comprises information of a target BWP for notifying the UE to activate or deactivate the target BWP; and
    activating or deactivating the target BWP according to the information of the target BWP;
    wherein a slot for activating or deactivating the target BWP, and/or a transmission order of each DCI is implicitly indicated by at least one of a cyclic redundancy check (CRC) code of each DCI, a demodulation reference signal (DMRS) of each DCI, or a control source set (CORESET) in which the DCI is located.

13. The method according to claim 12, wherein the DCI received by the UE is a UE specific DCI, a group common DCI, a scheduling DCI or a configured grant DCI, wherein the UE specific DCI, the group common DCI, the scheduling DCI or the configured grant DCI comprises therein an information field of information for indicating the target BWP; or
    the DCI transmitted to the UE is a DCI dedicated to activating or deactivating the target BWP.

14. The method according to claim 12, wherein the information of the target BWP is used to indicate the target BWP in a BWP set that is configured for the UE by the base station, the BWP set comprises N BWPs, wherein N is an integer greater than or equal to 1; and wherein each DCI indicates the index of the target BWP by using N or M×ceil($\log_2$ N) bits, wherein M is an integer greater than or equal to 1, and less than or equal to N, and the ceil is a rounding up function.

15. The method according to claim 12, wherein each DCI comprises indication information;
    wherein the indication information is used to indicate a timing for activating or deactivating the target BWP; or
    the indication information is used to indicate a transmission order of the DCI;
    wherein the step of receiving the at least one DCI transmitted by the base station comprises:
    receiving k DCIs transmitted by the base station, wherein k is an integer less than or equal to K, and K is a number of transmitting the DCI preset by the base station;
    the step of activating or deactivating the target BWP according to the information of the target BWP comprises:
    after receiving the k DCIs, activating or deactivating the target BWP according to an index of one or more of the k DCIs, in an activation or deactivation slot indicated by the indication information of this DCI, or in an activation or deactivation slot corresponding to the transmission order indicated by the indication information of this DCI.

16. The method according to claim 12, wherein the step of receiving the at least one DCI transmitted by the base station comprises:
    receiving the at least one DCI transmitted by the base station from an original BWP; and
    after the step of activating or deactivating the target BWP according to the information of the target BWP, the method further comprises:
    receiving data transmitted by the base station in the target BWP.

17. The method according to claim 14, wherein, after the step of receiving the at least one DCI transmitted by the base station, the method comprises:
    transmitting an acknowledgment (ACK) to the base station, and stopping detection of the DCI.

18. A base station, comprising: a storage, a processor, and a computer program which is stored on the storage and is capable of running on the processor, the computer program, when executed by the processor, is capable of implementing the steps in the method for controlling BWP according to claim 1.

19. A user equipment, comprising: a storage, a processor, and a computer program which is stored on the storage and is capable of running on the processor, the computer program, when executed by the processor, is capable of implementing the steps in the method for controlling BWP according to claim 12.

* * * * *